(12) United States Patent
Hall et al.

(10) Patent No.: US 10,783,479 B2
(45) Date of Patent: Sep. 22, 2020

(54) SYSTEM AND METHOD FOR DELIVERING A PACKAGE

(71) Applicant: Hall Labs LLC, Provo, UT (US)

(72) Inventors: David R. Hall, Provo, UT (US); Mark Hall, Springville, UT (US); Craig Boswell, Draper, UT (US); Daniel Nelson, Alpine, UT (US)

(73) Assignee: Hall Labs LLC, Provo, UT (US)

( * ) Notice: Subject to any disclaimer, the term of this patent is extended or adjusted under 35 U.S.C. 154(b) by 273 days.

(21) Appl. No.: 16/038,177

(22) Filed: Jul. 18, 2018

(65) Prior Publication Data

US 2020/0027054 A1    Jan. 23, 2020

(51) Int. Cl.
| | | |
|---|---|---|
| *G07C 9/00* | (2020.01) | |
| *G06Q 10/08* | (2012.01) | |
| *G07C 9/33* | (2020.01) | |

(52) U.S. Cl.
CPC ............. *G06Q 10/083* (2013.01); *G07C 9/33* (2020.01); *G07C 2009/00928* (2013.01); *G07C 2209/04* (2013.01); *G07C 2209/62* (2013.01)

(58) Field of Classification Search
CPC .............. G06F 21/86; G07D 11/125; G07C 2009/00928; E06B 7/32
See application file for complete search history.

(56) References Cited

U.S. PATENT DOCUMENTS

| | | | | |
|---|---|---|---|---|
| 7,765,131 | B2 * | 7/2010 | Klingenberg | G06Q 10/08 705/28 |
| 8,003,886 | B1 * | 8/2011 | Rintz | H05B 45/10 174/66 |
| 9,619,955 | B2 * | 4/2017 | Eichenblatt | G07C 9/00571 |
| 10,375,807 | B1 * | 8/2019 | Reilly | H05B 39/085 |
| 2002/0180580 | A1 * | 12/2002 | Gotfried | A47G 29/141 340/5.2 |
| 2005/0230594 | A1 * | 10/2005 | Sato | G05G 5/03 248/652 |
| 2006/0243568 | A1 * | 11/2006 | Badarneh | B60K 37/06 200/6 A |
| 2006/0293784 | A1 * | 12/2006 | Braunstein | G06Q 20/18 700/231 |
| 2011/0132735 | A1 * | 6/2011 | Iordache | G05G 9/047 200/314 |
| 2012/0032777 | A1 * | 2/2012 | Asselle | G06Q 20/38 340/5.7 |

(Continued)

*Primary Examiner* — Ariel J Yu
*Assistant Examiner* — Dana Amsdell

(57) ABSTRACT

A method and system are disclosed for delivering a package which includes an enclosure with a door. The door includes an access code input device, which has a tilt plate for entering a code. The method and system also include a mechanism for opening and closing the door and a controller, which is in communication with the access code input device, is proximate the door and includes an access code reader for controlling the mechanism. The method also includes the step of providing a package with a delivery label attached to the package having an access code comprising dimensions for the package to be delivered. The access code further includes instructions to partially move the door only for an amount of time needed to partially open the door from a closed position or partially close the door from an open position according to the dimensions of the package to only allow passage of the package.

20 Claims, 23 Drawing Sheets

(56) References Cited

U.S. PATENT DOCUMENTS

| | | | |
|---|---|---|---|
| 2014/0167574 A1* | 6/2014 | Shoenfeld | A47B 67/02 312/215 |
| 2014/0374225 A1* | 12/2014 | Ficek | H01H 25/008 200/61.54 |
| 2015/0120598 A1* | 4/2015 | Fadell | G06Q 10/0631 705/333 |
| 2015/0228419 A1* | 8/2015 | Fadell | G01J 5/025 307/112 |
| 2015/0371187 A1* | 12/2015 | Irwin | G07F 5/18 705/72 |
| 2016/0300187 A1* | 10/2016 | Kashi | G06Q 10/0832 |
| 2016/0370821 A1* | 12/2016 | Randle | G05G 9/04796 |
| 2018/0330589 A1* | 11/2018 | Horling | G06F 3/167 |
| 2019/0047460 A1* | 2/2019 | Goldberg | G06Q 20/40 |
| 2019/0139400 A1* | 5/2019 | Ikeler | G08C 23/00 |
| 2019/0167025 A1* | 6/2019 | Cherry | A47G 29/141 |
| 2019/0278319 A1* | 9/2019 | Fischer | H01H 13/10 |

* cited by examiner

Add New Access Code    900c

User ID: 910 — Repairman

Access Code: 7717 — 912

- ☐ Monday
- ☐ Tuesday
- ☑ Wednesday
- ☐ Thursday
- ☐ Friday
- ☐ Saturday
- ☐ Sunday Start Time: 09:00 AM End Time: 05:00 PM

} 914

Save    Back

Share With:
916 — johndoe@repairman.com

Edit Existing Access Code    900d

User ID: 910 — Dry Cleaner

Access Code: 1123 — 912

- ☐ Monday
- ☐ Tuesday
- ☑ Wednesday
- ☑ Thursday
- ☐ Friday
- ☑ Saturday
- ☑ Sunday Start Time: Any Time End Time: Any Time

} 914

Save    Back

Share With:
916 — janedoe@drycleaner.com

Fig. 9D

Recent Activity 900e

| User ID | Action | Time | Date |
|---|---|---|---|
| Shipping Co. 1 | CLOSED | 07:06 AM | 09/09/14 |
| Shipping Co. 1 | OPEN | 07:02 AM | 09/09/14 |
| Dry Cleaner | CLOSED | 01:33 PM | 09/08/14 |
| Dry Cleaner | OPEN | 01:32 PM | 09/08/14 |
| Repairman | CLOSED | 10:35 AM | 09/08/14 |
| Shipping Co. 2 | CLOSED | 8:49 AM | 09/08/14 |
| Shipping Co. 2 | OPEN | 8:47 AM | 09/08/14 |
| Repairman | OPEN | 8:15 AM | 09/08/14 |

} 918

920 — ☐ Show All Activity

[ Back ]

Fig. 9E

Recent Activity 900f

| User ID | Action | Time | Date |
|---|---|---|---|
| Shipping Co. 1 | CLOSED | 07:06 AM | 09/09/14 |
| Shipping Co. 1 | OPEN | 07:02 AM | 09/09/14 |
| Dry Cleaner | CLOSED | 01:33 PM | 09/08/14 |
| Dry Cleaner | OPEN | 01:32 PM | 09/08/14 |
| Remote | CLOSED | 11:15 AM | 09/08/14 |
| Remote | OPEN | 11:13 AM | 09/08/14 |
| Repairman | CLOSED | 10:35 AM | 09/08/14 |
| Invalid Acc. Code | NONE | 9:10 AM | 09/08/14 |

} 922

920 — ☑ Show All Activity

[ Back ]

Fig. 9F

Add New Access Code     1400a

User ID: Shipping Co. 1  
Access Code: 5668

☑ Monday     ☑ Friday  
☑ Tuesday     ☐ Saturday  
☑ Wednesday     ☐ Sunday  
☑ Thursday Start Time: 09:00 AM     End Time: 05:00 PM

[Save] [Back]

Open Time  
1402 — 3 Seconds

Fig. 14A

Add New Access Code     1400b

User ID: Shipping Co. 1  
Access Code: 5668

☑ Monday     ☑ Friday  
☑ Tuesday     ☐ Saturday  
☑ Wednesday     ☐ Sunday  
☑ Thursday Start Time: 09:00 AM     End Time: 05:00 PM

[Save] [Back]

Open Amount  
1402 — 1/2

Fig. 14B

Access Codes 1500a

| User ID | Access Code | Tracking Number | Open Time |
|---|---|---|---|
| Dry Cleaner | 1123 | | No Limit |
| Shipping Company 1 | 5668 | AZW71019625435668 | 3 Seconds |
| Kids | 8249 | | No Limit |
| Shipping Company 2 | 4532 | SMH71327982434532 | 2.5 Seconds |

[ Add ]  [ Back ]

Fig. 15A

Access Codes 1500b

| User ID | Access Code | Tracking Number | Amount Open |
|---|---|---|---|
| Dry Cleaner | 1123 | | 1 |
| Shipping Company 1 | 5668 | AZW71019625435668 | 1/2 |
| Kids | 8249 | | 1 |
| Shipping Company 2 | 4532 | SMH71327982434532 | 1/4 |

[ Add ]  [ Back ]

Fig. 15B

SYSTEM AND METHOD FOR DELIVERING A PACKAGE

CROSS-REFERENCE TO RELATED APPLICATIONS

This application claims priority to U.S. Provisional Patent Application Nos. 61/941,130 filed on Feb. 18, 2014 and entitled "Hidden Butler Access System," 61/971,978 filed on Mar. 28, 2014 and entitled "Unattended Access System," 61/979,935 filed on Apr. 15, 2014 and entitled "Solar Powered Key Pad," 61/985,399 filed on Apr. 28, 2014 and entitled "Personal Identification Code Management System," 61/975,644 filed on Apr. 4, 2014 and entitled "Multiple Security Code Software Application," and 61/977,070 filed on Apr. 8, 2014 and entitled "Intelligent Access System."

This application is also a continuation-in-part of U.S. patent application Ser. No. 14/532,523 filed on Nov. 4, 2014 and entitled "Automated Tracking-Number Based Administration of Access Codes;" Ser. No. 14/533,247 filed on Nov. 5, 2014 and entitled "Tracking-Number Extraction Facilitating Administration of Access Codes;" Ser. No. 14/533,268 filed on Nov. 5, 2014 and entitled "System and Method for Detecting Potentially Unauthorized Access to an Enclosure;" Ser. No. 14/533,291 filed on Nov. 5, 2014 and entitled "System and Method for Communicating and Authenticating an Access Code;" Ser. No. 14/533,324 filed on Nov. 5, 2014 and entitled "Access Code Administration and Sharing;" and Ser. No. 14/533,374 filed on Nov. 5, 2014. Further, this application is a continuation-in-part of co-pending U.S. patent application Ser. No. 14/740,246, filed on Jun. 15, 2015, entitled "Apparatus and Method for Automatically Allocating the Use of Assets." The foregoing applications are incorporated herein for all they contain, teach, and disclose.

TECHNICAL FIELD

This invention relates to systems and methods for efficiently delivering goods to recipients, administering access codes to provide access to enclosures, and preventing unauthorized access to enclosures.

BACKGROUND

In modern transport and shipping networks, freight is shipped with relative efficiency between major ports, stations, or hubs using ships, airplanes, trains, trucks, or other vehicles of mass transport. This efficiency typically ends or is greatly reduced when goods reach their final port, station, or hub, where they need to be transported to their final destination. The last leg of delivery, frequently referred as the "last mile," is typically the most inefficient part of the journey, incurring by some estimates twenty-eight percent of the total shipping costs. This relative inefficiency is often referred to as the "last mile problem." The last mile problem exists not only in freight networks, but also in telecommunication, utility, and public transportation networks.

In freight networks, the last mile may be fraught with challenges not only in terms of delivering goods, but also ensuring that goods are delivered in a way that limits risk and/or cost to a retailer and/or shipping company. For example, if goods are left on a customer's doorstep but are stolen or damaged prior to retrieval by the customer, a retailer may be responsible to replace the goods, or have a policy to replace the goods to maintain customer relations. This may incur significant costs to the retailer. For this reason, some retailers may require a customer signature or other verification to indicate that a customer has actually taken possession of delivered goods, particularly for expensive or fragile items. Unfortunately, such a requirement may dramatically increase shipping costs. If a customer is not available to receive goods or provide a signature when a delivery agent arrives at his or her doorstep, the delivery agent may need to return one or more additional times to reattempt delivery. Statistics show that a high percentage of goods on delivery trucks are goods that were not successfully delivered on the initial try.

In view of the foregoing, what are needed are systems and methods to more efficiently deliver goods to recipients. In particular, systems and methods are needed to efficiently deliver goods to recipients even when recipients are unavailable to receive delivery. To facilitate such delivery, systems and methods are needed to efficiently administer access codes to enable delivery agents and other authorized users to access enclosures such as garages or reception boxes. Further needed are systems and methods to ensure that such access codes are administered in a safe and secure manner. Yet further needed are systems and methods to prevent unauthorized access to enclosures.

SUMMARY

In a first aspect, the invention is a method for delivering a package. The method includes the step of providing an enclosure with a door. The door includes an access code input device, which has a tilt plate with a front side touch surface, a raised pivot on the backside of the tilt plate, and a plurality of spring loaded switches mounted along the periphery of the back side of the tilt plate. Electronic equipment is mounted on the back side of the tilt plate, such that an access code is entered by pressing along the periphery of the front side of the touch plate. The method also includes the step of providing a mechanism for opening and closing the door and a controller, which is in communication with the access code input device, is proximate the door and includes an access code reader for controlling the mechanism. The method also includes the step of providing a package with a delivery label attached to the package having an access code comprising dimensions for the package to be delivered. The access code further includes instructions to partially move the door only for an amount of time needed to partially open the door from a closed position or partially close the door from an open position according to the dimensions of the package to only allow passage of the package. The method further includes the step of presenting the package delivery label to the access code reader, or entering the access code using the input access code device. Finally, the method includes the step of partially opening or closing the door only to allow passage of the package, delivering the package through the door opening, and closing the door.

In a second aspect, the invention is a system for carrying out the method.

In a first embodiment of the invention, a method for more efficiently delivering goods to recipients is disclosed herein. Such a method includes obtaining a tracking number associated with an order of goods intended for delivery to a recipient. The method further includes obtaining an access code for association with the tracking number. The access code enables a delivery agent to gain access to an enclosure of the recipient for deposit of the goods therein. In certain embodiments, the access code is a temporary access code that expires once the delivery is fulfilled or the enclosure is accessed, thereby reducing the chance of unauthorized access to the enclosure. The method may also enable parameters (e.g., restrictions, constraints, conditions, etc.) with regard to use of the access code to be established. A corresponding system is also disclosed. The system includes an access code input device comprising a tilt plate comprising a front side touch surface, a raised pivot on the backside of the tilt plate, and a plurality of spring loaded switches mounted along the periphery of the back side of the tilt plate and electronic equipment mounted on the back side thereof such that an access code is entered by pressing along the periphery of the front side of the touch plate.

In a second embodiment of the invention, a method for more efficiently delivering goods to recipients is disclosed. Such a method includes receiving a communication, such as an email or text message, containing a tracking number. The tracking number is associated with an order of goods intended for delivery to a recipient. The method extracts the tracking number from the communication and generates an access code for association with the tracking number. The access code enables a delivery agent to gain access to an enclosure of the recipient for deposit of the goods therein. In certain embodiments, the access code is derived from the tracking number, such as by using certain digits or portions of the tracking number to generate the access code. A corresponding system is also disclosed. The system includes an access code input device comprising a tilt plate comprising a front side touch surface, a raised pivot on the backside of the tilt plate, and a plurality of spring loaded switches mounted along the periphery of the back side of the tilt plate and electronic equipment mounted on the back side thereof such that an access code is entered by pressing along the periphery of the front side of the touch plate.

In a third embodiment of the invention, a method for detecting potentially unauthorized access to an enclosure is disclosed. Such a method includes detecting movement (e.g., opening and/or closing) of an access barrier of an enclosure. The method further detects whether a motor was used to move the access barrier. This may be accomplished, for example, by detecting electrical current drawn by the motor, vibration of the motor, voltage drop of electrical power supplied to the motor, rotation of the motor, or the like. In the event the access barrier was moved without using the motor, the method notifies a user, such as by sending an email or text message to the user. A corresponding system is also disclosed as previously stated.

In a fourth embodiment of the invention, a method for more efficiently enabling access to an enclosure is disclosed. Such a method includes designating, on a computing device, an access code intended to enable access to an enclosure. The method further communicates, over a network, a first copy of the access code to a control mechanism configure to control access to the enclosure. A second copy of the access code is communicated to an end user device configured to directly communicate the second copy to the control mechanism. In certain embodiments, the end user device wirelessly communicates the second copy to the control mechanism using a short distance communication protocol. A corresponding system is also disclosed as stated previously.

In a fifth embodiment of the invention, a method for more efficiently enabling access to an enclosure is disclosed. Such a method includes designating an access code intended to enable access to an enclosure and identifying an end user for whom the access code is intended. The method automatically generates a communication addressed to the end user. The communication informs the end user that the access code has been established. In certain embodiments, the communication further informs the end user of any parameters that have been established for the access code. The method sends the communication to the end user using, for example, an email address or phone number of the end user. The method further communicates the access code to a control mechanism configured to control access to the enclosure. A corresponding system is also disclosed as previously described.

In a sixth embodiment of the invention, a method for more efficiently delivering goods to recipients is disclosed. Such a method includes generating an access code configured to enable access to an enclosure. The method further monitors a status of a delivery of goods intended for deposit in the enclosure. This may be accomplished, for example, by monitoring a package tracking system used to monitor and track delivery of the goods. In response to detecting fulfillment of the delivery, the method automatically causes the access code to expire. A corresponding system is also disclosed as previously described.

In a seventh embodiment of the invention, a method for enabling access to an enclosure is disclosed. Such a method includes obtaining an access code configured to enable access to an enclosure. The enclosure includes an access barrier capable of moving between a fully open position and a fully closed position. The method further establishes, for the access code, a setting associated with an intermediate position between the fully open position and the fully closed position. The setting may include, for example, an amount of time needed by an access mechanism to move the access barrier from the fully closed position to the intermediate position or an intermediate value between a first value associated with the closed position and a second value associated with the open position. Use of the access code to access the enclosure causes the access barrier to stop at the intermediate position. A corresponding system is also disclosed as previously described.

BRIEF DESCRIPTION OF THE DRAWINGS

The following drawings are provided to illustrate certain embodiments described herein. The drawings are merely illustrative, and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIGS. 9A-H show various exemplary pages of an application for administering access codes;

FIGS. 14A and 14B show embodiments of pages that may be used to establish access codes causing an access barrier to stop at an intermediate position; and FIGS. 15A and 15B show embodiments of pages listing access codes causing an access barrier to stop at an intermediate position.

DETAILED DESCRIPTION

Figure 1:
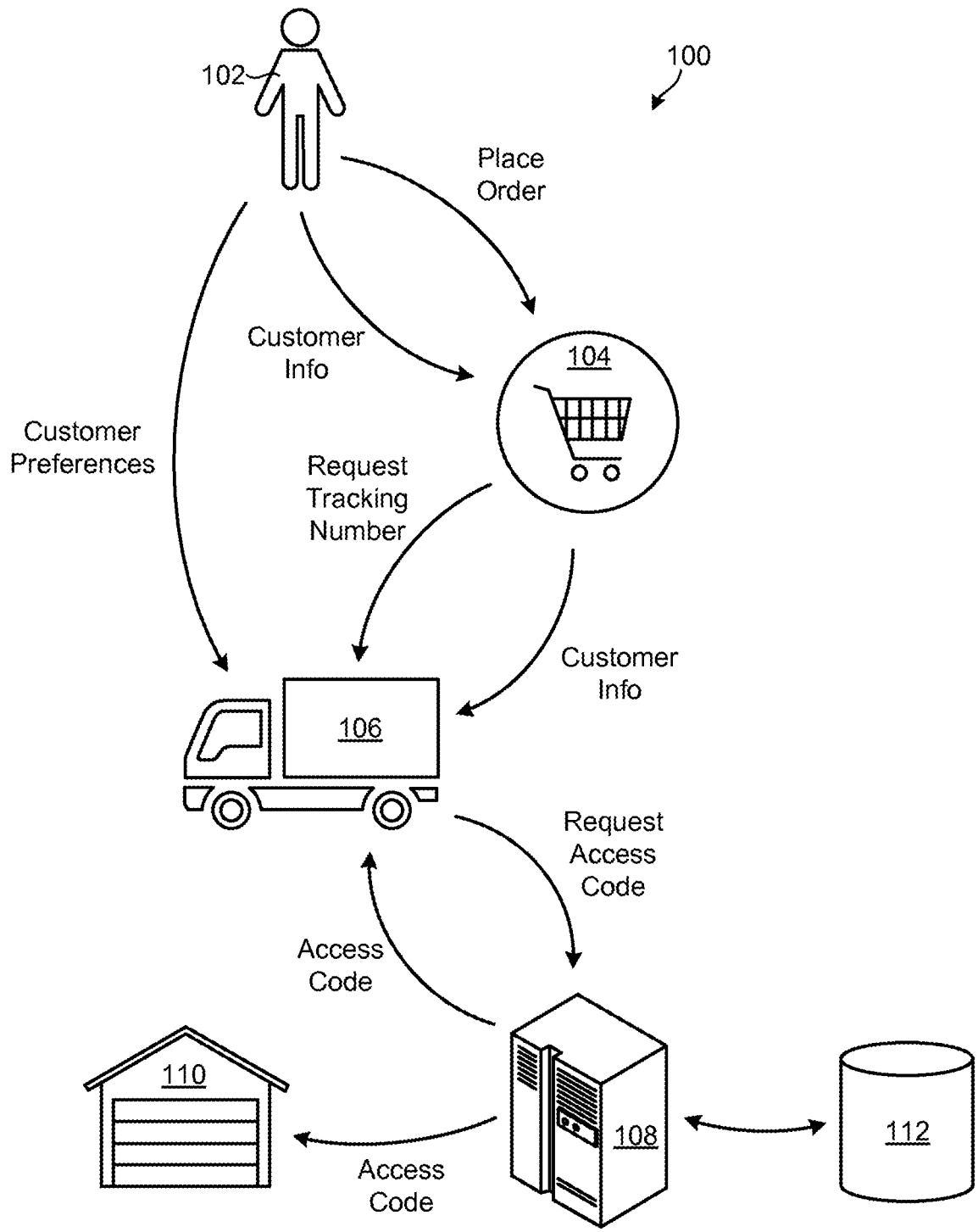
FIG. 1 is a high-level view of a first embodiment of a delivery fulfillment system in accordance with the invention.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, a high-level view of one embodiment of a delivery fulfillment system 100 in accordance with the invention is illustrated. Such a delivery fulfillment system 100 may be helpful in reducing inefficiencies associated with delivering goods over the "last mile," as previously discussed. As shown, in the illustrated embodiment, a customer 102 may initially place an order for goods with a merchant 104, such as an online merchant 104. In certain embodiments, when generating an order, the merchant 104 may gather information about the customer 102 (i.e., recipient 102), such as name, address, payment information, and the like. Alternately, the merchant 104 may receive authentication information from the customer 102 that enables the merchant 104 to retrieve previously stored information about the customer 102. Once customer information is received and an order is completed, the merchant 104 may decide to fulfill the order as a single shipment or divide the order into multiple shipments depending on the logistics for fulfilling the order. For each shipment, the merchant 104 may obtain a tracking number. In certain embodiments, such a tracking number may be requested from a shipper 106 tasked with delivering goods associated with the order. This tracking number may enable a shipment to be monitored and tracked as it moves from the merchant 104 to the customer 102.

In order to reduce inefficiencies associated with last-mile delivery, it may be advantageous to enable delivery agents to deliver goods in a safe and secure manner regardless of whether a customer is present when a delivery agent arrives. For example, if a delivery agent arrives at a customer's doorstep to deliver a package only to find that the customer is not present, the delivery agent may need to return the next day or leave the package at the customer's doorstep. In some cases, leaving the package at the customer's doorstep is not an option. For example, some goods may be sufficiently fragile, expensive, or sensitive that a merchant 104 may require verification (e.g., a signature, etc.) that goods have been received by a customer 102.

On the other hand, a merchant may be more inclined to allow unattended delivery if goods could be left in a safe and secure location. For example, if goods could be left in an enclosure such as a garage, reception box, gated area, warehouse, or other secure enclosure, a merchant may be more inclined to allow unattended delivery of fragile, expensive, or sensitive items. On the other hand, customers may be reluctant to allow delivery agents to access secure enclosures such as garages when they are not present due to the potential for theft, compromises in personal security, or other reasons. Other issues, such as how and under what circumstances access would be granted to a delivery agent, may also need to be addressed before a customer feels comfortable allowing access to a secure enclosure. Thus, it would be an advance in the art to enable unattended delivery into secure enclosures while simultaneously addressing issues with respect to theft, personal security, and the like. One embodiment of such a system is illustrated in FIG. 1.

In certain embodiments in accordance with the invention, a server 108 may be established to provide a temporary access code to a shipper 106 in exchange for a tracking number. For example, assuming a customer 102 has agreed to such an arrangement, upon generating or receiving a tracking number for a particular shipment, the shipper 106 may provide the tracking number and customer information (such as a customer ID) to the server 108. The server 108 may, in turn, return an access code to the shipper 106 which is linked to the tracking number. In certain embodiments, a database 112 coupled to the server 108 may store information such as customer information (such as a customer ID), each tracking number associated with the customer, the access code associated with each tracking number, parameters associated with each access code, and the like.

In addition to providing the access code to the shipper 106, the server 108 may communicate with and program an access mechanism (e.g., a garage door opening mechanism) of a customer's enclosure 110 (e.g., garage) with the access code. This may include establishing any parameters (e.g., constraints, limitations, etc.) associated with using the access code. Communication may occur over the Internet, a wide-area-network, a cell-phone-network, or other suitable network. When a delivery agent arrives at the delivery site (a customer's home, business, etc.), the delivery agent may gain access to the customer's enclosure 110 using the access code, thereby allowing a package or other goods to be deposited therein. The enclosure 110 may then be secured (by closing an access barrier, or door, of the enclosure 110). In certain cases, a shipper 106 (or merchant 104) may allow a customer 102 to establish certain customer preferences, such as allowing the customer 102 to opt in to the aforementioned unattended delivery service.

Instead of generating an access code that provides indefinite access to an enclosure 110, the access code may be temporary such that it will automatically expire at a specified time or in response to a specified event. For example, the access code may be a single-use access code that expires after a single use or a multiple-use access code that expires after a specified number of uses. In other embodiments, the access code automatically expires when a particular shipment is fulfilled. That is, when a particular shipment is designated as "delivered" or "fulfilled" in a package tracking system or other database, the access code may automatically expire. Thus, systems and methods in accordance with the invention may in certain embodiments be configured to monitor the status of a shipment of goods using a package tracking system or a database used to track a package's delivery status. The package tracking system could be a proprietary system or one generally available, such as over the Internet.

In yet other embodiments, an access code may be configured to expire after a specified amount of time (e.g., two weeks) has passed. Combinations of the above criteria or other criteria may also be used to determine when an access code expires. For example, an access code may be configured to expire after it is used a single time or after two weeks, whichever comes sooner. In another example, an access code may be configured to expire after a tracking number associated with the access code is designated as "fulfilled" or after two weeks, whichever comes sooner. In this way, access to an enclosure 110 may be granted on a temporary basis as opposed to an indefinite basis, thereby preventing or reducing the chance that the access code will be used for unauthorized access to the enclosure 110 as well as providing peace-of-mind for a customer.

Other parameters are also possible and within the scope of the invention. For example, an access window may be established for an access code such that the access code will only enable access to a enclosure 110 between certain times of the day, on certain days of the week, or the like. In certain embodiments, an access window may be established around an estimated delivery date for a shipment. For example, an access window may be established two days before and after an estimated delivery date to provide a shipper 106 some leeway when delivering a package. Other methods for determining a suitable access window are also possible and within the scope of the invention.

In certain embodiments, use of an access code may be configured to trigger various notifications. For example, when an access code is used to gain access to an enclosure 110, a notification may be sent to a customer 102 associated with the enclosure 110 indicating that the access code has been used. This may inform the customer 102 that a particular package or shipment has arrived as well as alert the customer 102 to any irregularities or possible unauthorized access. In certain embodiments, the amount of time an enclosure 110 is open may be monitored to ensure that unauthorized activities are not occurring. For example, if a typical delivery takes one minute to open an enclosure, deposit a package, and close the enclosure, an alert may be sent if the enclosure is open for more than one minute. Notifications may also be sent anytime an access code is used to attempt to gain access to an enclosure 110, even if access is not ultimately granted. In this way, an individual 102 may continually monitor access or attempts to access an enclosure 110.

In certain embodiments, data stored by the server 108 and database 112 may be specially configured to protect customer information. For example, a customer ID number opposed to a name and/or address) may be used to identify a customer in the database 112. This customer ID may be linked to specific tracking numbers and access codes, as well as a network address for communicating with an access mechanism (e.g., a garage door opening mechanism) of the customer. Thus the names and/or addresses of customers may be omitted from the database 112. Thus, if a hacker were to overcome security measures to gain access to the server 108 and/or database 112, the hacker would be unable to acquire substantial sensitive information about the customer, or have difficulty linking information in the database 112 to the customer. In certain embodiments, a zip code may be stored for each customer D in the database 112 to allow the server 108 to determine a time zone in which the customer 102 resides. This may allow the server 108 to enforce access windows, expiration times, or other time-or date-sensitive parameters associated with access codes.

In certain cases, the merchant 104 and shipper 106 illustrated in FIG. 1 may be a single business entity, or commonly-owned business entities 104, 106. For example, a merchant 104 may provide a shipping service that delivers goods directly to customers 102. In such cases, the merchant 104 and shipper 106 illustrated in FIG. 1 may act as a single entity. It follows that communications between the merchant 104 and shipper 106 may be unneeded in such embodiments. In any event, the single entity (merchant 104 and shipper 106 combined) may communicate with the server 108 and database 112 in substantially the same way described above.

Figure 2:
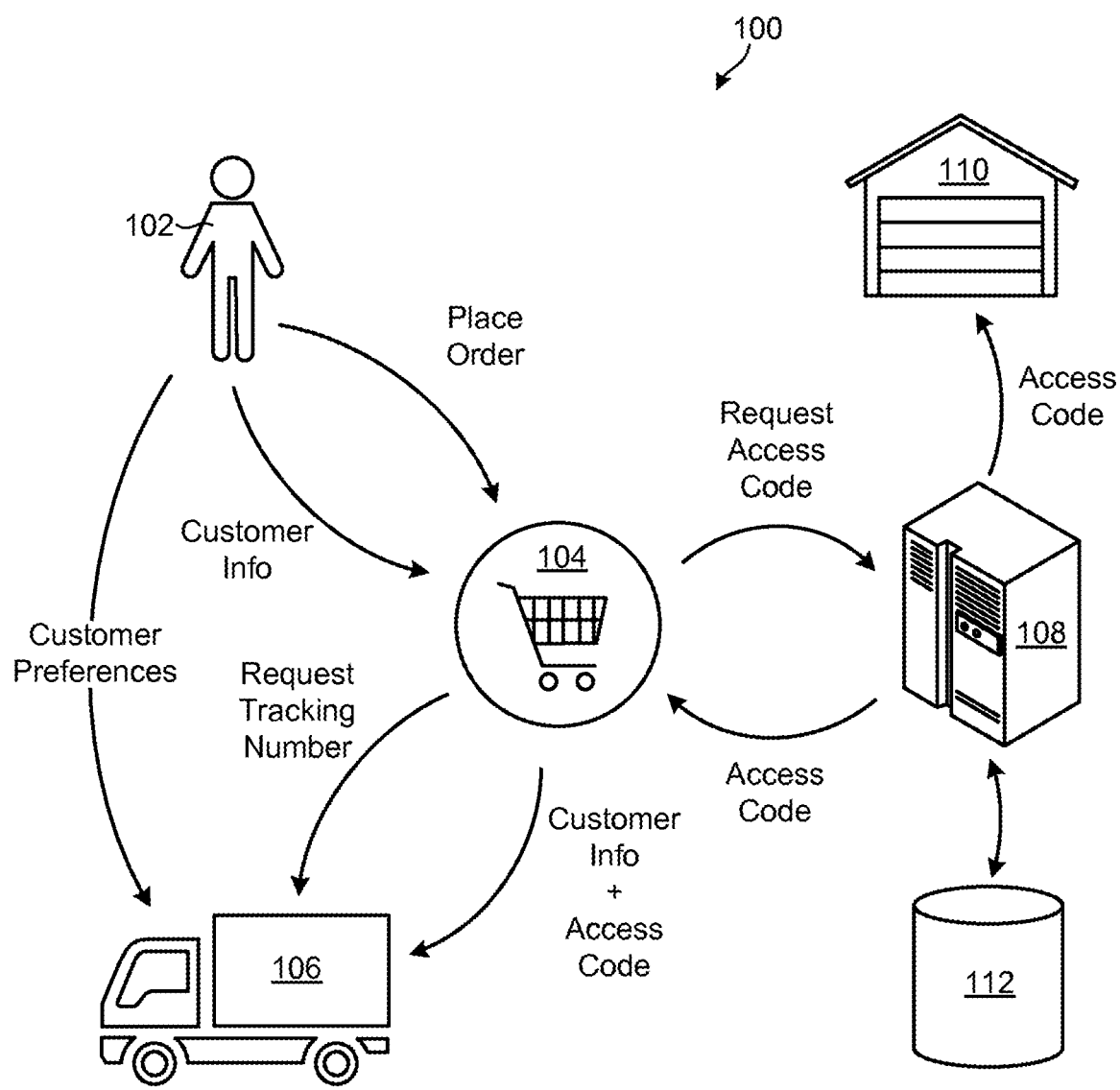
FIG. 2 is a high-level view of a second embodiment of a delivery fulfillment system in accordance with the invention.

Referring to FIG. 2, a high-level view of another embodiment of a delivery fulfillment system 100 in accordance with the invention is illustrated. This embodiment is similar to the embodiment illustrated in FIG. 1 except that a merchant 104, instead of a shipper 106, procures an access code from the server 108. Once an order is complete, the merchant 104 may request a tracking number from the shipper 106 or generate or obtain a tracking number on its own. Using the tracking number, the merchant 104 may request an access code from the server 108. Once the access code is received, the merchant 104 may provide the access code to the shipper 106 for use with the tracking number. The server 108, in turn, may communicate with and program an access mechanism (e.g., garage door opening mechanism) of the customer's enclosure 110 (e.g., garage) with the access code. This may include designating any parameters associated with using the access code. The embodiment described in FIG. 2 may be more feasible in situations where the merchant 104 may be working with multiple shipping companies, or may be shipping some goods itself while outsourcing the shipment of other goods to other companies. By procuring the access code itself, the merchant 104 may decide how and to whom to distribute the access code.

Figure 3:
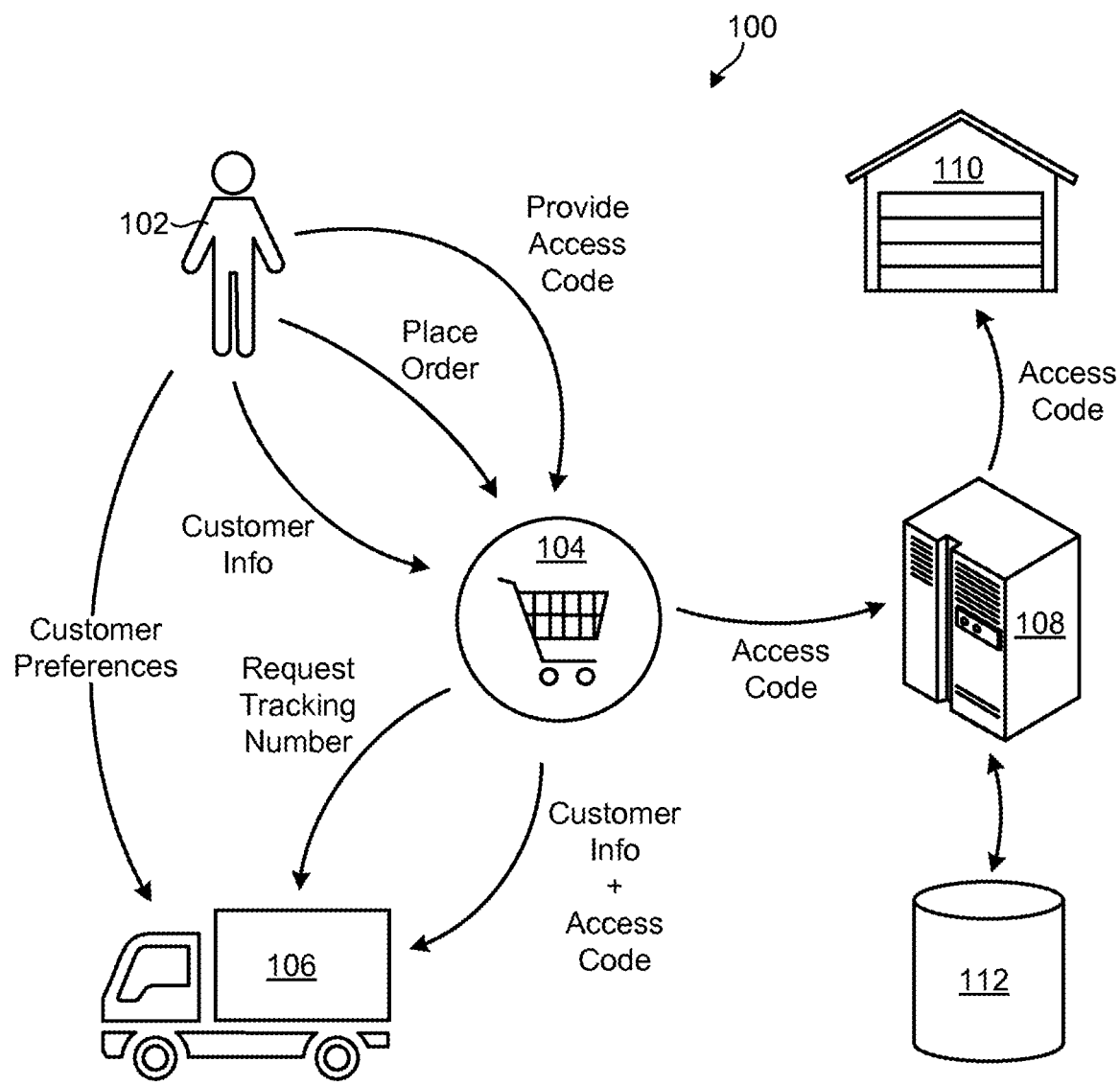
FIG. 3 is a high-level view of a third embodiment of a delivery fulfillment system in accordance with the invention.

Referring to FIG. 3, a high-level view of another embodiment of a delivery fulfillment system 100 in accordance with the invention is illustrated. In this embodiment, an access code or authorization to generate an access code is procured from a customer 102 as opposed to being automatically generated by a server 108. For example, when a customer 102 completes an order, the customer 102 may be queried if he or she would like to assign an access code to the order. If affirmative, the customer 102 may provide an access code to the merchant 104 for use with the order. Alternatively, an access code may be automatically generated on behalf of the customer 102, such as by the merchant 104. This access code may be provided to a shipper 106 for use with a tracking number. The access code may also be provided to a server 108 which may in turn communicate with and program an access mechanism of the customer's enclosure 110. Alternatively, the customer may program the access mechanism with the access code using an access-code-management application, as will be explained in more detail hereafter. Like the previous examples, the access code may expire at designated time or in response to a designated event (e.g., one or more uses of the access code). Use of the access code may also be limited by various parameters, as previously discussed.

Figure 4:
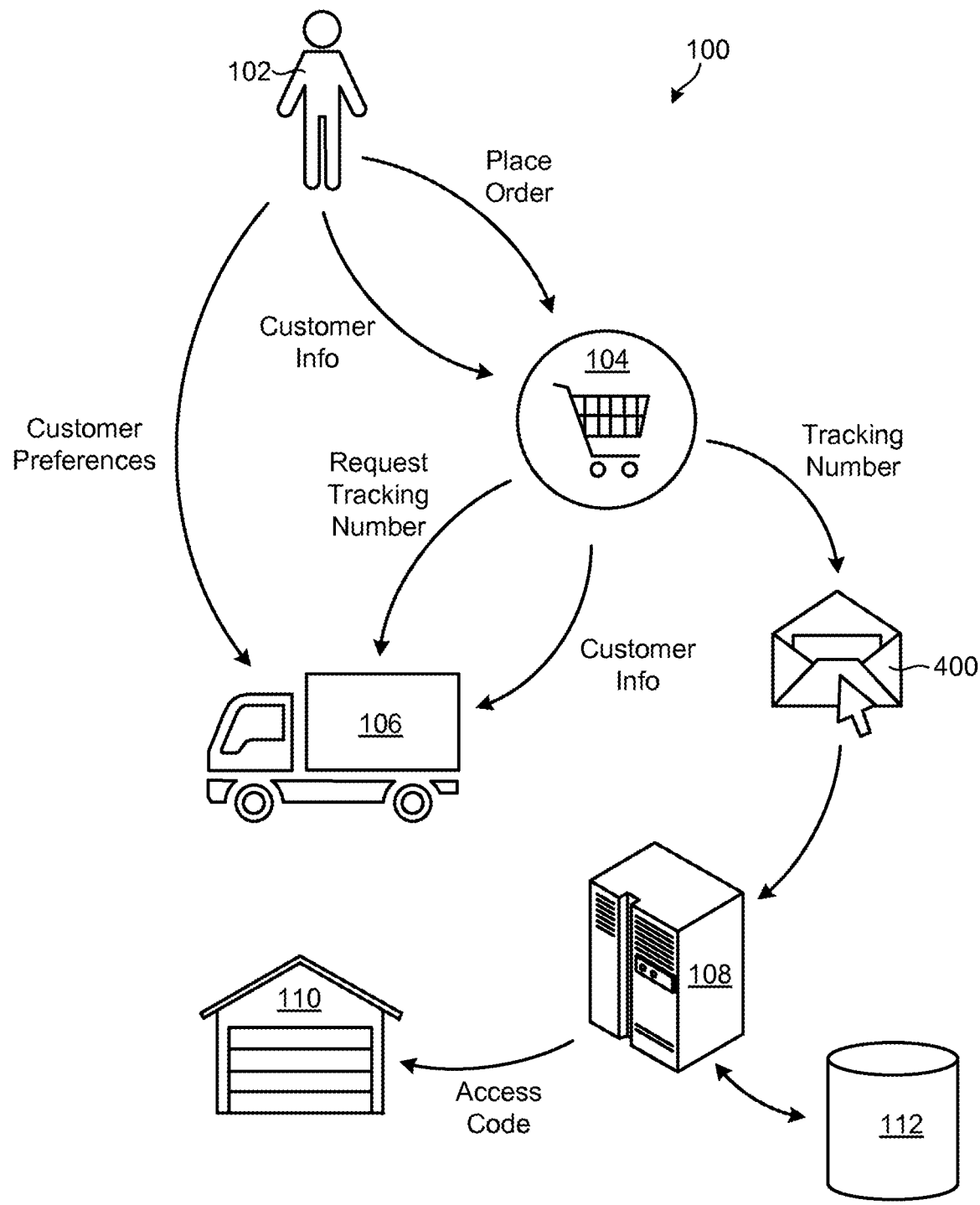
FIG. 4 is a high-level view of a fourth embodiment of a delivery fulfillment system in accordance with the invention.

Referring to FIG. 4, in certain cases, it may be advantageous to provide a delivery fulfillment system 100 that bypasses one or more of a merchant 104 and shipper 106. Such a delivery fulfillment system 100 may provide the features and benefits discussed above without requiring buy in from a merchant 104 and/or shipper 106. In certain embodiments, such a system 100 may rely on communications 400 sent by merchants 104 in response to orders or purchases. For example, many merchants 104 will send one or more confirmation emails or texts to a customer 102 indicating details of an order as well as a tracking number associated with the order. A copy of such communications 400 may be sent or forwarded to a server 108 in accordance with the invention. In certain embodiments, a customer 102 may add a server address (email address, text address, etc) to a list of recipients that receive alerts or notifications when an order is placed or shipped. The server 108 may in turn extract a tracking number from one or more of the communications 400 and generate an access code associated with the tracking number. In certain embodiments, the access code is derived from the tracking number. For example, the access code may be the last n (e.g., three or four) digits of the tracking number. The server 108 may in turn program an access mechanism of the customer's enclosure 110 with the access code.

When a delivery agent arrives at the customer's location, the delivery agent may be instructed (by a note or other means) to deposit the shipment into the customer's enclosure 110. The delivery agent may also be instructed on how to derive the access code from the tracking number. Alternatively, the customer 102 may establish customer preferences with the shipping company 106 that directs the delivery agent to use the last n digits of a tracking number (or derive the access code from the tracking number in some other way) to access the customer's enclosure 110 for deposit of goods therein. Other methods for communicating an access code to a delivery agent, such as downloading an access code directly to a delivery agent's mobile or handheld device, are also possible and within the scope of the invention.

Figure 5:
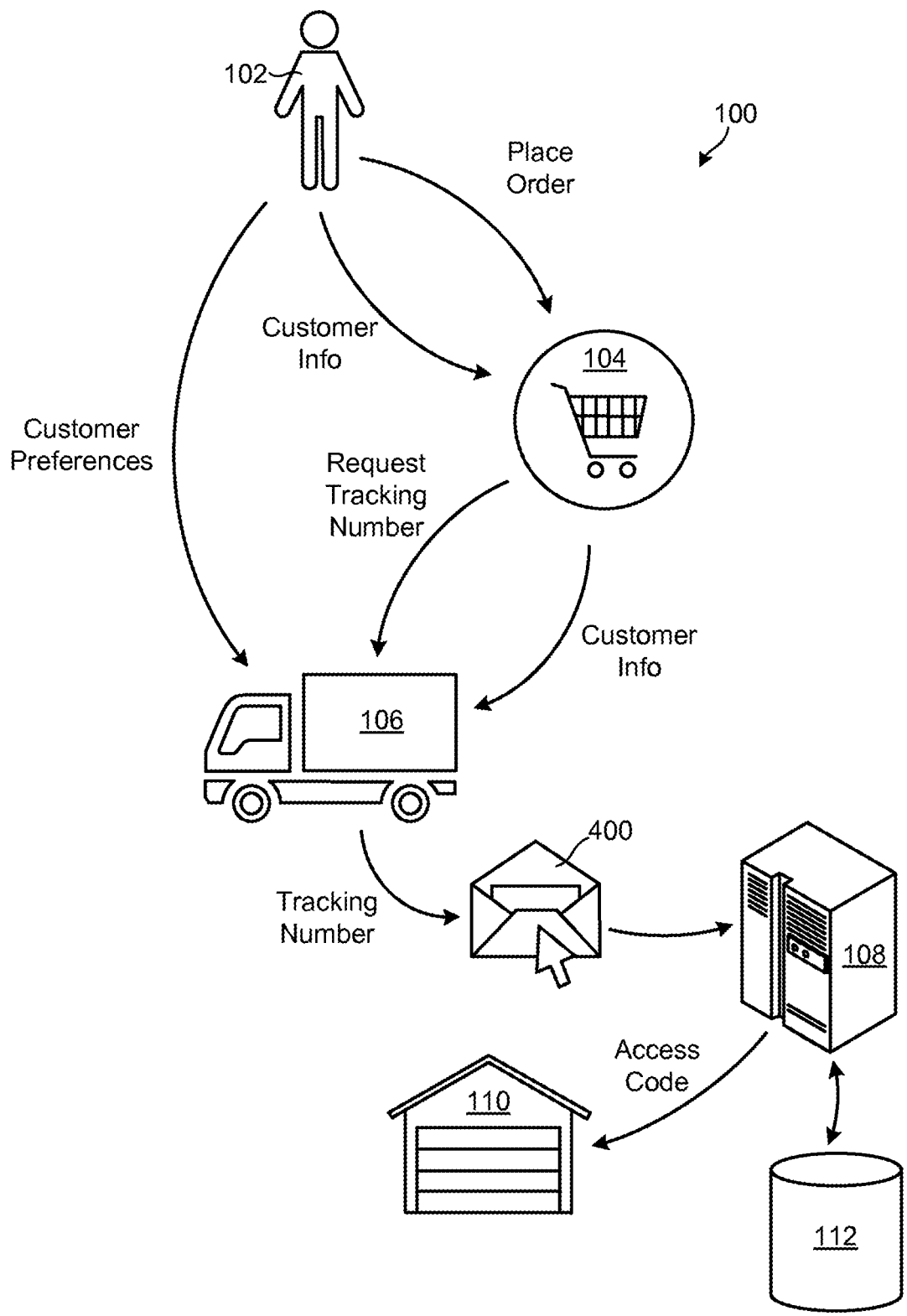
FIG. 5 is a high-level view of a fifth embodiment of a delivery fulfillment system in accordance with the invention.

Referring to FIG. 5, in other embodiments, a delivery fulfillment system 100 in accordance with the invention may be configured to receive and extract customer information and tracking numbers from communications 400 originating from a shipper 106. For example, various shippers 106 may allow customers 102 to establish shipping preferences, such as when and where shipments are delivered, what types of alerts and notifications are generated, and the like. These preferences may be set to provide communications 400 to a server 108 in accordance with the invention. Alternatively, a customer 102 may forward or send communications 400 received from the shipper 106 to the server 108. The server 108 may in turn extract relevant information, such as customer identifiers and tracking numbers, from the communications 400. These customer identifiers and tracking numbers may in turn be used to generate access codes, which may be used to program the access mechanisms of customer enclosures 110.

Figure 6:
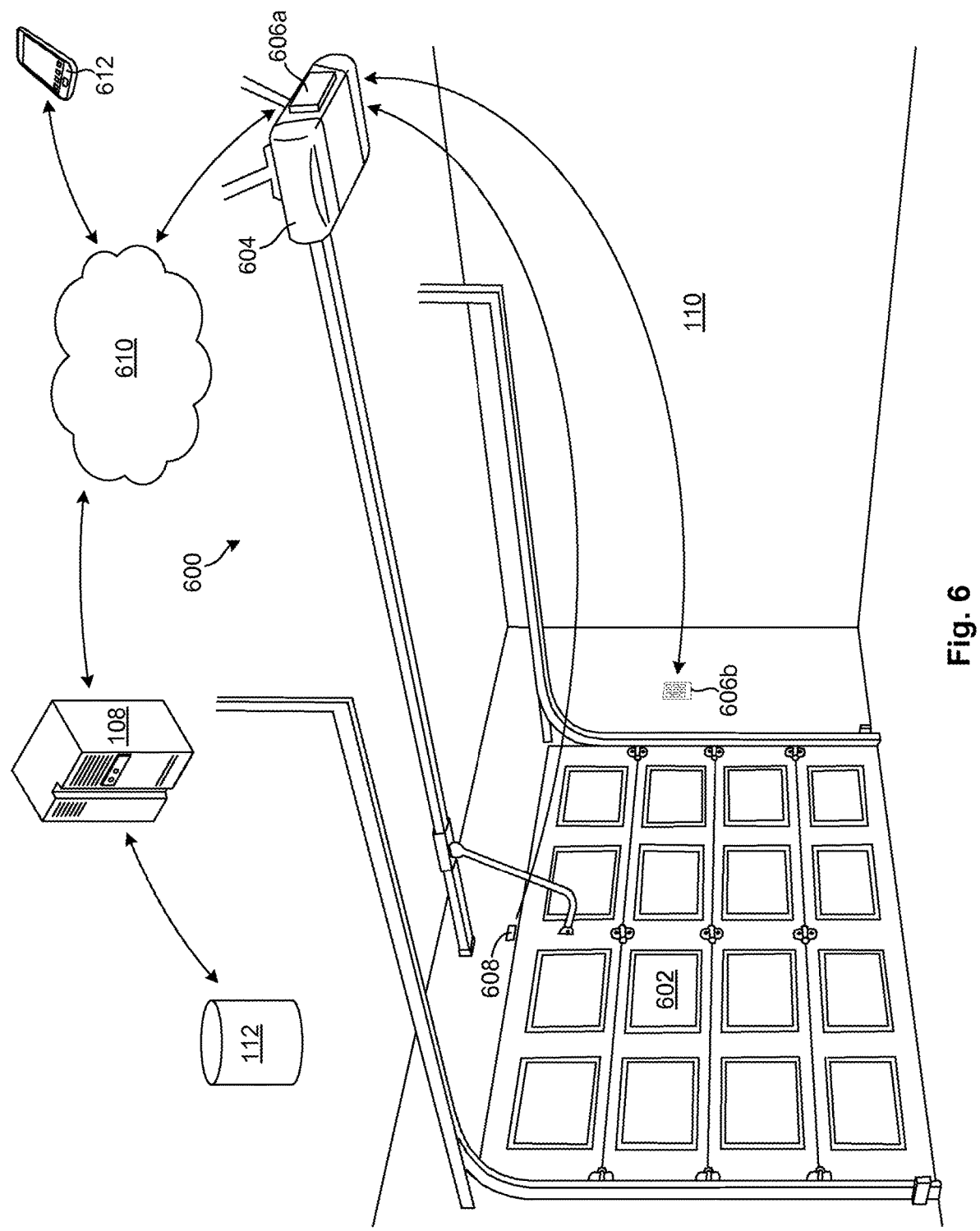
FIG. 6 is a perspective view of one embodiment of an enclosure, in this example a garage, using a programmable access mechanism to control access thereto.

Referring to FIG. 6, as previously mentioned, a delivery fulfillment system 100 in accordance with the invention may be configured to program an access mechanism of a customer's enclosure 110. FIG. 6 shows one embodiment of an access mechanism 600, in this example a garage door opening mechanism 600, configured to control access to a garage 110. In the illustrated embodiment, the garage door opening mechanism 600 includes a garage door opener 604 and a control mechanism 606. In this example, the control mechanism 606 includes a control module 606*a* and an input device 606*b* (or tilt plate device 1600 as shown in FIGS. 16-18) (such as a keypad 606*b* (or tilt plate device 1600 as shown in FIGS. 16-18)). To open the garage door 602, a user may input an access code into the input device 606*b* (or tilt plate device 1600 as shown in FIGS. 16-18). This access code may be transmitted to the control module 606*a* where it may be compared to one or more stored access codes that have been programmed into the control module 606*a*. If the entered access code matches a stored access code and any parameters associated with the stored access code are satisfied, the control module 606*a* may cause the a garage door opener 604 to open the garage door 602. On the other hand, if the entered access code does not match a stored access code or the entered access code matches a stored access code but does not comply with one or more parameters associated with the stored access code, the control module 606*a* may deny entry to the garage 110.

As shown, the server 108 may communicate with the control module 606*a* over a network 610 such as the Internet. In certain embodiments, the control module 606*a* is configured with a wired or wireless adapter to enable communication with a router or other device (hub, gateway, access point, etc.) connected to the Internet. Communication may occur using a protocol or technology such as WIFI or other radio frequencies such as proprietary RF protocols. In other embodiments, the control module 606*a* may communicate with a home automation system and receive data and/or control signals from a home automation controller or through a home automation controller connected to the Internet. In such embodiments, a home automation protocol such as Zigbee® or Z-Wave.RTM. may be used. In certain embodiments, such communication protocols may be used not only to communicate with the server 108, but also to enable communication between the input device 606*b* (or tilt plate device 1600 as shown in FIGS. 16-18), control module 606*a*, and/or garage door opening mechanism 600.

The server 108 may program the control module 606*a* with access codes to enable access to the garage 110. The server 108 may also have the ability to remove access codes that are programmed into the control module 606*a*. Access codes that are programmed into the control mechanism 606 may also be configured to automatically expire at designated times and/or in response to designated events without intervention by the server 108. Once programmed, the control mechanism 606 may be configured to compare entered access codes with stored access codes as well as enforce parameters associated with the stored access codes.

The control mechanism 606 (including the control module 606*a* and input device 606*b* (or tilt plate device 1600 as shown in FIGS. 16-18)) illustrated in FIG. 6 is advantageous in that it may be easily retrofitted to existing garage door openers 604. Because existing garage door openers 604 may use different wireless communication protocols to enable remote control and communication, providing an input device 606*b* (or tilt plate device 1600 as shown in FIGS. 16-18) that supports all or most wireless communication protocols may be costly and overly complex. By implementing the control mechanism 606 as an input device 606*b* (or tilt plate device 1600 as shown in FIGS. 16-18) and control module 606*a*, a single wireless communication protocol may be used between the input device 606*b* (or tilt plate device 1600 as shown in FIGS. 16-18) and control module 606*a*. The control module 606*a*, which may be located on or proximate a garage door opener 604, may actuate the garage door opener 604 in the same or similar way as a wired switch. Thus, implementing the control mechanism 606 as two components (a control module 606*a* and input device 606*b* (or tilt plate device 1600 as shown in FIGS. 16-18)) may eliminate or reduce compatibility problems with various wireless communication protocols. Nevertheless, in other embodiments, the input device 606*b* (or tilt plate device 1600 as shown in FIGS. 16-18) may be configured to communicate in the native wired or wireless communication protocol of existing garage door openers, such as in embodiments where the control mechanism 606 is implemented entirely within the input device 606b (or tilt plate device 1600 as shown in FIGS. 16-18).

Implementing the control mechanism 606 as a separate input device 606b (or tilt plate device 1600 as shown in FIGS. 16-18) and control module 606a may also allow the input device 606b (or tilt plate device 1600 as shown in FIGS. 16-18) to operate in a very low power state when not being used. In some cases, a wired power source may not be readily available to the input device 606b (or tilt plate device 1600 as shown in FIGS. 16-18), thereby making battery power necessary. Keeping the input device 606b (or tilt plate device 1600 as shown in FIGS. 16-18) in a very lower power state when not in use may substantially extend battery life. The control module 606a, by contrast, due to its proximity to a garage door opener 604 or its position within a garage 110, may have more ready access to a wired power source (possibly the same power source as the a garage door opener 604), thereby making power consumption less of a concern.

In certain embodiments, the input device 606b (or tilt plate device 1600 as shown in FIGS. 16-18) is used primarily to receive access codes from users. These access codes may be transmitted to the control module 606a where they may be compared to acceptable access codes to either permit or deny entry to the enclosure 110. In such embodiments, much of the functionality and/or processing power of the control mechanism 606 may be incorporated into the control module 606a as opposed to the input device 606b (or tilt plate device 1600 as shown in FIGS. 16-18). In other embodiments, however, sufficient processing power and/or functionality may incorporated into the input device 606b (or tilt plate device 1600 as shown in FIGS. 16-18) to allow access codes to be stored and compared at the input device 606b (or tilt plate device 1600 as shown in FIGS. 16-18). For example, in certain embodiments, much or all of the functionality of the control module 606a may be incorporated into the input device 606b (or tilt plate device 1600 as shown in FIGS. 16-18). In certain embodiments, the control module 606a may be eliminated entirely by incorporating all functionality into the input device 606b (or tilt plate device 1600 as shown in FIGS. 16-18).

In yet other embodiments, certain functionality associated with the control module 606a may be performed by the server 108. For example, access codes entered at the input device 606b (or tilt plate device 1600 as shown in FIGS. 16-18) may be transmitted to the server 108 where they may be compared to one or more access codes stored in the database 112. If the access codes match and any parameters with the access codes are satisfied, the server 108 may remotely control (e.g., open, close) the garage door 602. Centralized control at the server 108 may provide various benefits (centralized management of hardware, software, customer data, etc.) but also have drawbacks associated with centralized control. For example, centralized control may require a reliable network connection between the server 108 and garage door opening mechanism 600. Interruptions or latency in the network may impair the ability of the server 108 to receive access codes from the input device 606b (or tilt plate device 1600 as shown in FIGS. 16-18) as well as remotely control the garage door opening mechanism 600.

As shown in FIG. 6, in certain embodiments, an access mechanism 600 in accordance with the invention may include one or more sensors 608. In certain embodiments, a sensor 608 may be configured to detect a position or movement of an access barrier 602, such as a garage door 602. This may allow the server 108, control module 606a, or other components (such as a customer's mobile device 612 or computing system 612) to determine if the garage door 602 is open or closed at any given time. In certain embodiments, the sensor 608 may also be configured to sense if the access barrier 602 is transitioning from an open to a closed position, or vice versa, at any given time. Such a sensor 608 may enable components such as the server 108 and control module 606a to make decisions based on the current and intended position of the access barrier 602. In certain embodiments, the sensor 608 may also be used to determine whether an access barrier 602 has been opened without authorization, such as in case of a break in, as will be explained in more detail hereafter.

As further shown in FIG. 6, in certain embodiments, a customer device 612, such as a mobile device 612 or computing system 612, may communicate with the control mechanism 606. In certain embodiments, an access-code-management application or other functionality on the customer device 612 may allow access codes to be added to, modified, or removed from the control module 606a. In certain embodiments, the customer device 612 may communicate directly with the control module 606a. In other embodiments, the customer device 612 may communicate with a centralized server 108, which may in turn communicate with the control module 606a.

The access-code-management application on the customer device 612 may also include functionality to enable the customer 102 to establish parameters for access codes programmed into the control module 606a. These parameters may include, for example, a number of times an access code may be used prior to expiration, an amount of time the access code is valid prior to expiration, days or times when the access code may be used, or the like. For example, a customer 102 may wish to program the control mechanism 606 with a temporary access code to enable a house cleaner or repairman to temporarily access the customer's enclosure 110. The customer 102 may only wish to grant access during business hours on a specific day or days of the week. The customer 102 may also want the temporary access code to expire after a week even if it is never used. The access-code-management application may enable the customer 102 to program the control module 606a with a temporary access code having one or more of the aforementioned parameters. The access-code-management application may also allow the customer 102 to retire access codes that are no longer needed. Using the above-described functionality, a customer 102 may assign different access codes to different people and manage the access codes separately. This eliminates the need to share more permanent access codes (perhaps an access code used by the customer 102 and/or family members) with persons who may only require access on a temporary basis or on specific days or times. The ability to perform such on a mobile device 612 or computing device 612 also allows a customer 102 to manage the access codes using a more advanced interface as well as manage such remotely.

Figure 7:
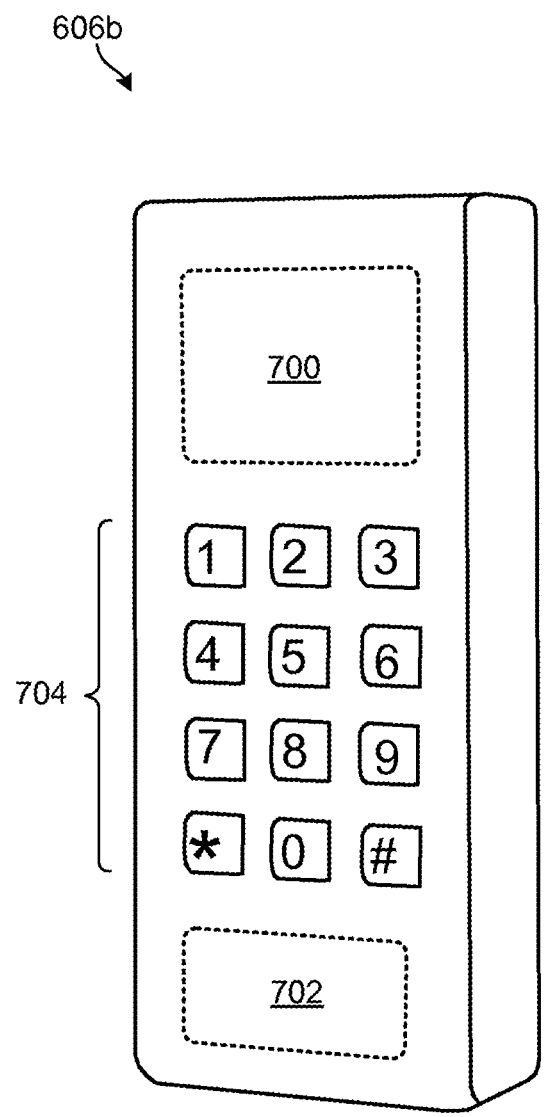
FIG. 7 shows one embodiment of an input device for receiving an access code.

Referring to FIG. 7, one embodiment of an input device 606b (or tilt plate device 1600 as shown in FIGS. 16-18) in accordance with the invention is illustrated. As shown, the input device 606b (or tilt plate device 1600 as shown in FIGS. 16-18) is embodied as a keypad 606b (or tilt plate device 1600 as shown in FIGS. 16-18), although other types of input devices 606b (or tilt plate device 1600 as shown in FIGS. 16-18) may also be used. Where a keypad 606b (or tilt plate device 1600 as shown in FIGS. 16-18) is used, a user may enter an access code by pressing one or more keys 704 in a particular sequence. As previously discussed, in certain embodiments, the input device 606b (or tilt plate device

1600 as shown in FIGS. 16-18) may wake up upon receiving the access code. The access code may be forwarded to the control module 606a previously described, where the access code may be compared to one or more acceptable access codes. Alternatively, the input device 606b (or tilt plate device 1600 as shown in FIGS. 16-18) may receive the access code and compare the access code to one or more acceptable access codes at the input device 606b (or tilt plate device 1600 as shown in FIGS. 16-18). If a match is found and any parameters associated with the matching access code are satisfied (e.g., the access code has not expired and/or the access code was entered during an acceptable access window), the control module 606a may actuate the access mechanism 600, causing the access mechanism 600 to open the access barrier 602.

Other or additional methods for receiving access codes may also be incorporated into the input device 606b (or tilt plate device 1600 as shown in FIGS. 16-18). For example, instead of manually inputting an access code, a user may wirelessly communicate an access code to the input device 606b (or tilt plate device 1600 as shown in FIGS. 16-18) using, for example, a mobile computing device (e.g., smart phone, etc.). In such an embodiment, the access code may be communicated to the input device 606b (or tilt plate device 1600 as shown in FIGS. 16-18) using a short distance communication protocol such as Near Field Communication (NFC) or Bluetooth™. To enable such communication, the input device 606b (or tilt plate device 1600 as shown in FIGS. 16-18) may include a reader 700 incorporating NFC, Bluetooth™, or other wireless functionality. To wake up the input device 606b (or tilt plate device 1600 as shown in FIGS. 16-18), the mobile computing device may, in certain embodiments, be tapped against the input device 606b (or tilt plate device 1600 as shown in FIGS. 16-18). The input device 606b (or tilt plate device 1600 as shown in FIGS. 16-18) may, in turn, include an accelerometer, vibration, or other motion sensing device to sense contact from the mobile computing device and wake up other functionality of the input device 606b (or tilt plate device 1600 as shown in FIGS. 16-18). In this way, the input device 606b (or tilt plate device 1600 as shown in FIGS. 16-18) may be kept in a very low power state when not in use.

In other embodiments, the input device 606b (or tilt plate device 1600 as shown in FIGS. 16-18) may include scanning functionality, such as an optical or RFID scanner 702, to scan a tag or label storing the access code. The access code may be represented or stored in a bar code, matrix code, chip, integrated circuit, magnetic strip, or the like. The tag or label may, in certain embodiments, be physically attached to a package or other goods to be delivered into the enclosure 110. One benefit of storing the access code in a mobile computing device, tag, or label, is that the access code may be more difficult to copy or transfer. It may also enable a delivery agent to access an enclosure 110 without having actual knowledge of the access code. This, in turn, may provide greater security and reduce or prevent unauthorized use of the access code.

Figure 8A:
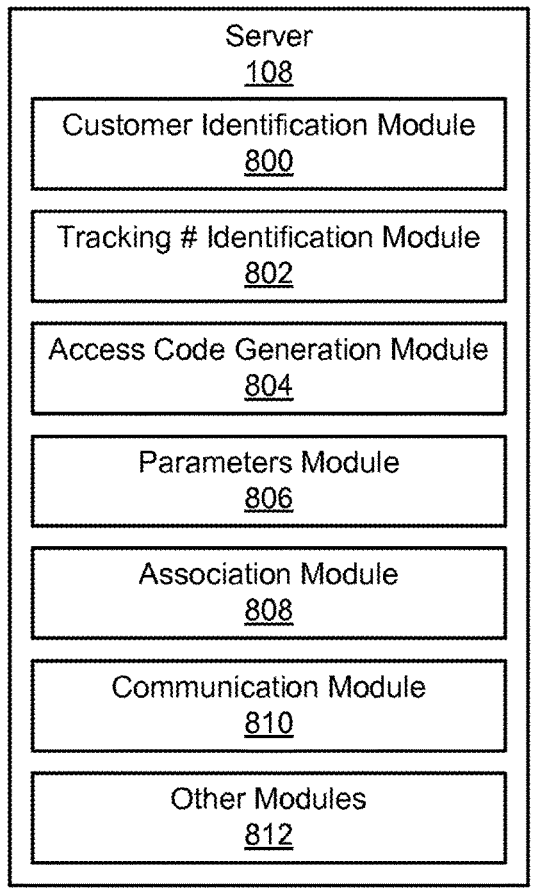
FIGS. 8A-C show various modules that may be incorporated into a server, control mechanism, and customer device in accordance with the invention.
Figure 8B:
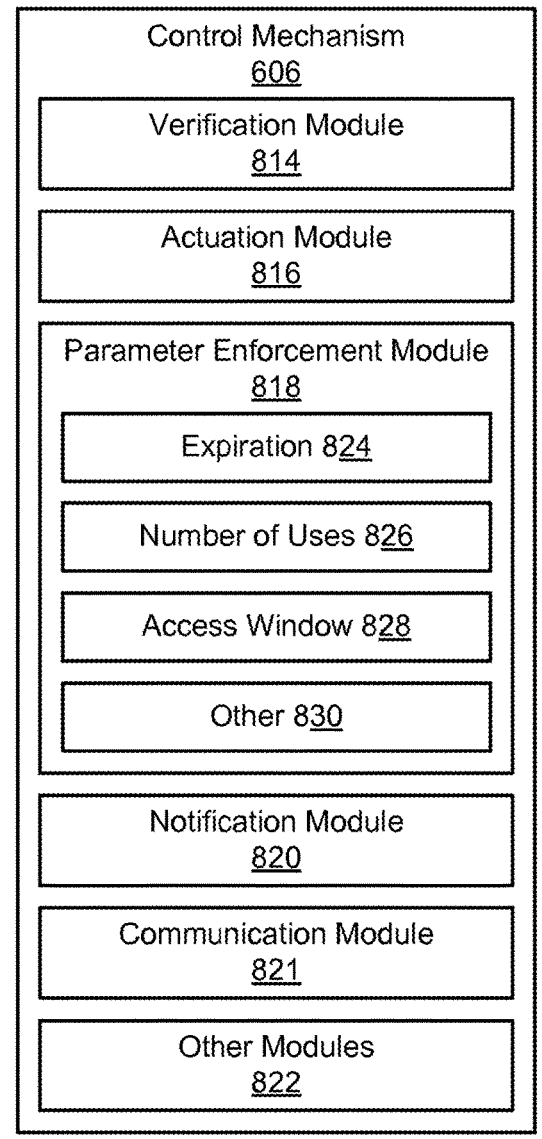
Figure 8C:
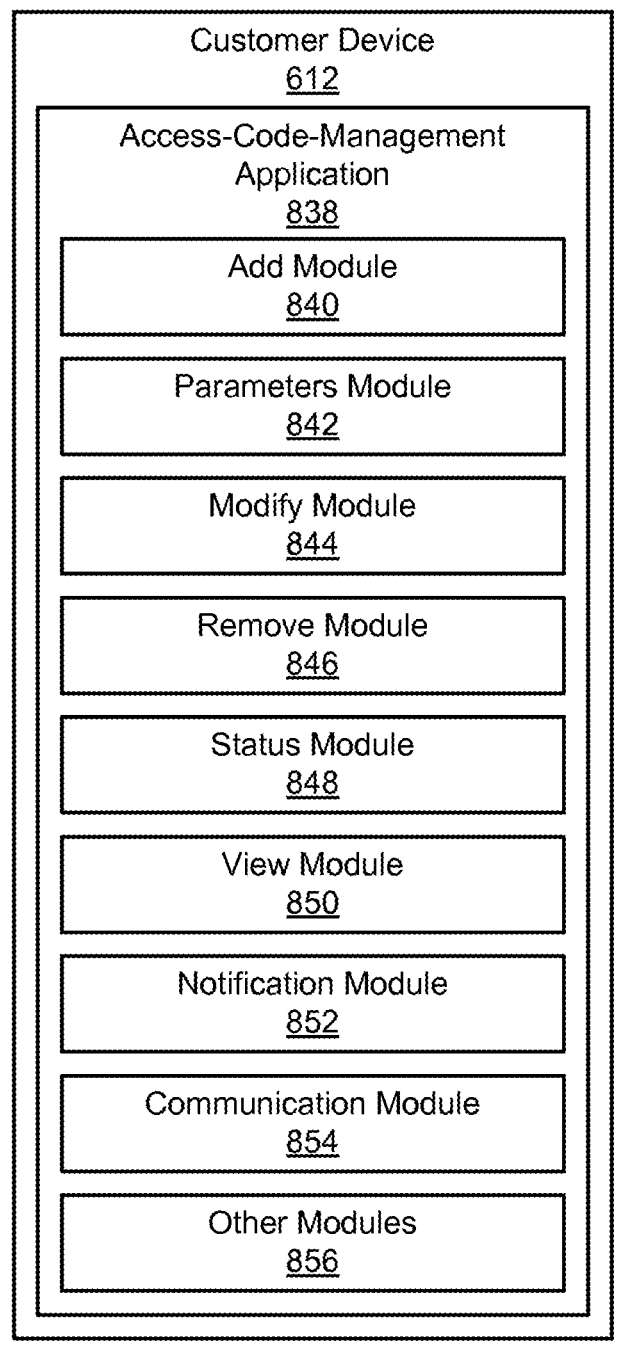

Referring to FIGS. 8A-C, the features and functions described above may be implemented in the form of one or more modules running on the server 108, control mechanism 606 (which may include the control module 606a and/or input device 606b (or tilt plate device 1600 as shown in FIGS. 16-18)), and customer device 612. These modules may be implemented in hardware, software, firmware, or a combination thereof. The modules, as well as their locations, are presented only by way of example and not limitation. Other modules are possible or the functionality of the modules may be organized differently in various embodiments. The modules are not necessarily tied to the locations where they are illustrated. For example, certain functionality shown in the server 108 may, in certain embodiments, be implemented in the control mechanism 606 or customer device 612, or vice versa. Other functionality shown in a single location may, in certain embodiments, be distributed across multiple locations, such as across the server 108 and control mechanism 606. Thus, the illustrated modules and their locations are presented only by way of example and not limitation.

As shown in FIGS. 8A and 8B, in certain embodiments, a server 108 in accordance with the invention may include one or more of a customer identification module 800, a tracking number identification module 802, an access code generation module 804, a parameters module 806, an association module 808, a communication module 810, and other modules 812. The control mechanism 606 (including the control module 606a and/or input device 606b (or tilt plate device 1600 as shown in FIGS. 16-18)), on the other hand, may include one or more of a verification module 814, an actuation module 816, a parameter enforcement module 818, a notification module 820, a communication module 821, and other modules 822.

A customer identification module 800 may identify a customer 102 associated with a selected tracking number. In certain embodiments, the customer 102 is identified by a unique customer ID. The customer ID may allow a tracking number to be associated with a customer as well as allow an access code associated with the tracking number to be programmed into an access mechanism 600 of the customer. Thus, the customer ID may, in certain embodiments, have a network address associated therewith, where the network address enables communication with an access mechanism 600 of the customer's enclosure 110. In certain embodiments, the customer ID is an esoteric ID that would prevent a hacker or intruder from specifically identifying a customer 102 associated with the customer ID.

A tracking number identification module 802 may identify a tracking number associated with the customer 102. In certain embodiments, this tracking number is received directly from a merchant 104 or shipper 106. In other embodiments, the tracking number is extracted from a communication 400, such as an email or text, directed to a customer 102 of the merchant 104 or shipper 106. Once a tracking number is identified, an access code generation module 804 may generate an access code associated with the tracking number. In certain embodiments, the access code generation module 804 derives the access code from the tracking number, such as by using selected digits (e.g., the last three or four digits) of the tracking number. In other embodiments, the access code generation module 804 randomly generates the access code or generates the access code using an algorithm unrelated to the tracking number. Alternatively or additionally, the access code generation module 804 may enable a user to designate the access code.

A parameters module 806 may enable various parameters to be established for an access code. For example, the parameters module 806 may designate a date and/or time the access code will expire. Alternatively, or in addition, the parameters module 806 may designate an event or event that may cause the access code to expire. For example, the access code may expire after a single use, a designated number of uses, in response to an event such as marking a delivery as "completed" or "fulfilled", or in response to user action such as manually causing the access code to expire. The parameters module 806 may also designate when an access code is valid. For example, an access code may only allow access to an enclosure 110 on certain days (e.g., weekdays, weekends, Mondays, etc.), or at certain times (e.g., business hours, afternoons, mornings, etc.) of the day.

An association module 808 may associate an access code with a tracking number, such as by linking the two in the database 112 previously discussed. A communication module 810 may be configured to communicate an access code to an access mechanism 600 of a customer's enclosure 110, along with any parameters associated with the access code. In certain embodiments, the communication module 810 may transmit the access code to the access mechanism 600 over the Internet or other suitable network. Other modules 812 providing other desired functionality may also be provided by the server 108, as needed.

At the control mechanism 606 (which may include the control module 606a and/or input device 606b (or tilt plate device 1600 as shown in FIGS. 16-18)), a verification module 814 may receive an access code entered at the input device 606b (or tilt plate device 1600 as shown in FIGS. 16-18) and compare the access code to one or more acceptable access codes. If a match occurs and any parameters associated with the matching access code are satisfied (e.g., the matching access code has not expired, the access code was entered within a specified access window, etc.), an actuation module 816 may actuate the access mechanism 600 of the customer's enclosure 110. A parameter enforcement module 818 may ensure that any parameters (e.g., expiration 824, permitted number of uses 826, access window 828, or other parameters 830) associated with an access code are enforced.

A notification module 820 may provide notifications (e.g., emails, text messages, audio messages, etc.) to a customer 102. For example, in some embodiments, the notification module 820 may notify the customer 102 anytime the access barrier 602 is opened and/or closed regardless of whether an access code was used to open or close the access barrier. The notification module 820 may also notify the user what access codes, if any, were used to access the enclosure 110. In other embodiments, the notification module 820 may notify a user whenever an access code (either correct or incorrect) is entered into the input device 606b (or tilt plate device 1600 as shown in FIGS. 16-18). In yet other embodiments, the notification module 820 may notify a user when new access codes have been programmed into or removed from the system. In other embodiments, the notification module 820 may report a current status of the access barrier 602, such as whether the access barrier is open, closed, or moving. In yet other embodiments, the notification module 820 may notify a user if an enclosure 110 is opened without actuating the access mechanism 600 (such a scenario may occur where a garage door 602 is opened without use of a garage door opener 604, as may occur with a break in), as will be explained in more detail hereafter. Other notifications are possible and within the scope of the invention. Notifications may keep a user informed of the status of the enclosure 110 as well as the current state or changes to the current state of the system. Using this information, a user may determine if and when a package or other goods has been delivered into the enclosure 110, or if and when someone has accessed or attempted to access the enclosure 110, with or without authorization.

Referring to FIG. 8C, in certain embodiments, a customer device 612 (e.g., a mobile device 612 or other computing device 612) may host an access-code-management application 838 to administer access codes associated with the control mechanism 606. This access-code-management application 838 may include one or more of an add module 840, a parameters module 842, a modify module 844, a remove module 846, a status module 848, a view module 850, a notification module 852, a communication module 854, and other modules 856.

An add module 840 may enable a customer 102 to add access codes, as needed, to the control mechanism 606. These access codes may be permanent (until removed or altered by the customer 102) or temporary (automatically expiring at a specified time or in response to one or more events). A parameters module 842 may enable the customer 102 to establish parameters for the access codes, such as times or events that will cause the access codes to expire, access windows or restrictions when the access codes may be used, or the like. A modify module 844 may enable the customer 102 to modify an existing access code, such as by modifying the access code itself, or modifying parameters associated with the access code. A remove module 846, by contrast, may enable the customer 102 to remove access codes from the control mechanism 606 when they are no longer needed or desired.

A status module 848 may enable a user to see the status of various components of the access mechanism 600 and control mechanism 606. For example, the status module 848 may enable a user to see the current status of the access barrier 602 (e.g., garage door 602), such as whether the access barrier 602 is currently open, closed, or moving. In other or the same embodiments, the status module 848 may enable the customer 102 to see if a control mechanism 606a and/or input device 606b (or tilt plate device 1600 as shown in FIGS. 16-18) are up and running correctly, or if a communication link (Internet access, etc.) is active between the control module 606a and a server 108 or customer device 612. The status module 848 may also enable a customer to see current battery charge levels (of the input device 606b (or tilt plate device 1600 as shown in FIGS. 16-18) and/or control mechanism 606a) or current software or firmware versions that are being used. The status module 848 may keep the customer 102 informed of and/or enable the customer 102 to determine the current state of the system.

In certain embodiments, a view module 850 may enable a customer 102 to view information with regard to the current system configuration or system use. For example, the view module 850 may enable a user to see all currently valid access codes, as well as parameter information associated with the access codes. Where the access codes are associated with tracking numbers, the view module 850 may also in certain embodiments enable the user to see the tracking numbers associated with the access codes. The view module 850 may also in certain embodiments enable a user to view historical information about the system. For example, the view module 850 may enable a user to view current and expired access codes utilized over a period of time, as well as historical use information associated with the access codes. For example, a user may view when particular access codes were used to access or to attempt to access an enclosure 110. These represent just a few exemplary types of information that may be displayed by the view module 850.

A notification module 852 may be used to provide notifications in response to certain system changes or events. For example, if a new access code is generated and programmed into the control module 606a, the notification module 852 may send a notification to an individual or entity intended to use the access code. For example, if a user generates a temporary access code to enable a repairman to access an enclosure 110, the notification module 852 may send a communication (e.g., an email or text message) to the repairman, notifying him or her that an access code has been generated to enable access to the enclosure 110. The notification may also contain the access code or provide information regarding how to retrieve or determine the access code. The communication may, in certain embodiments, also communicate any parameters associated with the access code, such as when the access code is valid or will expire, or when the access code may be used.

A communication module 854 may enable the customer device 612 to communicate with the control module 606a and/or server 108. For example, the communication module 854 may enable the customer device 612 to pull a current list of active access codes (and associated tracking numbers) from the control module 606a and/or server 108 for viewing. The communication module 854 may also enable the customer device 612 to communicate with and reconfigure the control module 606a with desired access codes. Other modules 856 providing additional features and functions may also be provided in the customer device 612.

Referring to FIGS. 9A through 9E, various exemplary pages 900 of an access-code-management application 838, configured to operate on a customer device 612, are illustrated. Such pages 900 may provide a graphical user interface (GUI) for many of the modules discussed in association with FIG. 8C.

Figures 9A, 9B:
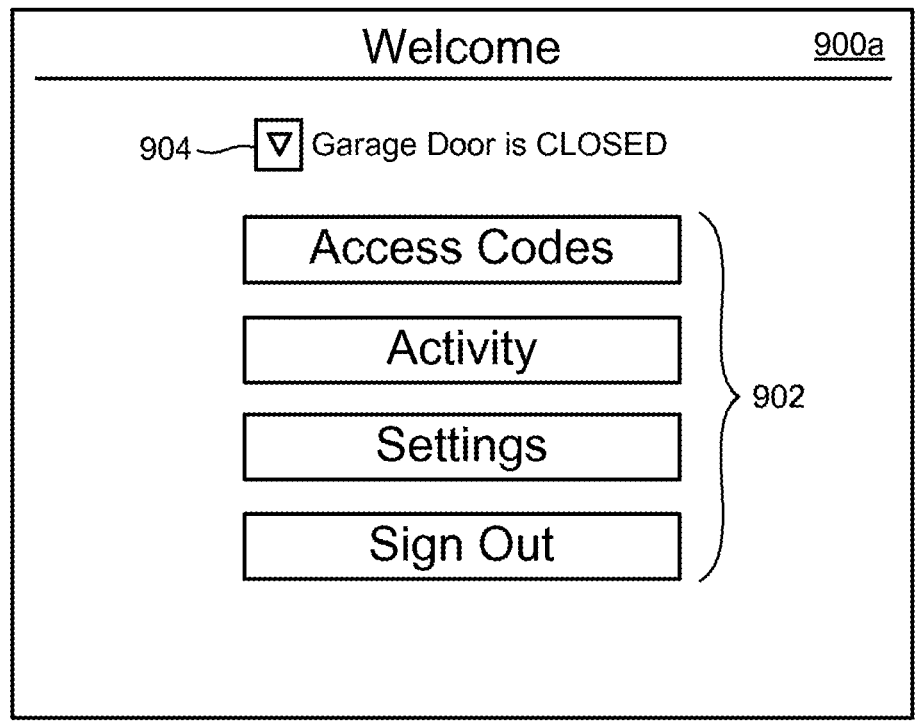

FIG. 9A shows one embodiment of a home page 900a or welcome screen 900a. As shown, the home page 900a may provide various types of information 904 and options 902 to a user. In the illustrated embodiment, the home page 900a shows a status 904 of a garage door 602, in particular indicating whether the garage door 602 is currently opened or closed. The home page 900a also provides a user various options 902, such as view or modify the user's access codes, view activity with respect to the access mechanism 600 and/or access codes, view settings of the access mechanism 600 and/or control mechanism 606, or the like.

For example, referring to FIG. 9B, by selecting the "access codes" option 902, the user may be presented with a page 900b listing currently active access codes. In the illustrated embodiment, each access code is associated with a user identifier. This user identifier may be a word or phrase that enables the user to remember a purpose of the access code and/or who the access code is assigned to. In the illustrated example, the user identifier includes names such as "dry cleaner," "shipping company 1," "kids," and "shipping company 2." Alternatively, or additionally, a term such as "shirts" or "Amazon" may be used to identify goods or a merchant associated with an access code. As further shown in FIG. 9B, an option 906 may be presented to the user to add a new access code. A page enabling the user to add an access code is illustrated in FIG. 9C. Options may also be provided to modify or remove an existing access code. For example, a user may select an existing access code in the list 908 and be presented with options to either modify or remove the access code.

In certain embodiments (not shown), the page 900b illustrated in FIG. 9B may optionally show access codes that have expired or been removed. This may allow a user to have a historical view of access codes that have been used over a period of time, including access codes that are no longer in use.

FIG. 9C shows one embodiment of a page 900c for adding an access code. As shown, the page 900c enables a user to designate a user identifier 910 and associated access code 912. In certain embodiments, the access code is randomly generated or is generated using an algorithm, such as a sequential and/or rotating algorithm. A sequential algorithm may generate access codes in a specified sequence whereas a rotating algorithm may enable eventual reuse of access codes (a repeating sequence, for example). In other embodiments, the user may designate the access code. As further shown in FIG. 9C, the page 900c may also enable various parameters 914 to be established for the access code 912. For example, the user may designate days of the week and/or times of the day when the access code is valid. In other embodiments, the user may establish when the access code expires, or what events (e.g., number of uses, etc.) may cause the access code to expire.

In certain embodiments, an option 916 may be provided to share the access code with an end user. For example, if an access code is generated on behalf of a repairman, an option 916 may be provided to share a copy of the access code with the repairman. In the illustrated embodiment, the page 900c enables a user to designate contact information, such as an email address or cellular phone number, so that a communication (e.g., email or test message) can be sent to the end user intended to utilize the access code. The communication may contain the access code 912 or instructions for retrieving the access code 912. Alternatively or additionally, the communication may enable the access code 912 to be uploaded to an end user computing device, such as a mobile computing device. This may allow the end user to directly communicate the access code to the input device 606b (or tilt plate device 1600 as shown in FIGS. 16-18) using the computing device. In certain embodiments, the communication may also specify any parameters 914 associated with the access code 912, thereby informing the end user when or under what conditions the access code may be used.

FIG. 9D shows one embodiment of a page 900d for modifying an access code 912. As shown, the page 900d may enable a user to modify a user identifier 910 associated with an access code 912, the access code 912 itself, or parameters 914 associated with the access code. The page 900d may also allow the user to share the modified access code 912 and any modified parameters with an end user intended to use the access code 912.

FIG. 9E shows one embodiment of a page 900e displaying activity associated with an access mechanism 600 and/or access codes. In the illustrated embodiment, the user is presented with a table 918 that shows a user identifier, what actions were performed in association with the user identifier (e.g., whether an access barrier 602 was opened or closed), as well as a time and date the actions were performed. In certain embodiments, the activity is shown over a specified period of time, which may in certain embodiments be user configurable.

In certain embodiments, filters may be applied to data displayed on the page 900e. For example, an option 920 may be provided to "show all activity." Selecting this option 920 may display an expanded set 922 of data, as shown in FIG. 9F. This expanded set 922 of data may include, for example, operations or attempts to operate an access mechanism 600 that did not involve an access code, or unsuccessful attempts to open or close the access mechanism 600 using an incorrect access code. For example, as shown in FIG. 9F, a page 900f providing an expanded set 922 of data displays when a conventional remote control was used to operate the access mechanism 600 as well as an attempt to operate the access mechanism 600 using an invalid access code. In certain embodiments, the particular remote control that was used to operate the access mechanism 600 may be identified (e.g., "mom's remote," "kid's remote," etc.). Other activity that may be monitored may include opening or closing the access barrier 602 using an interior wall switch, or cases where an access barrier 602 was opened or closed without using the access mechanism 600 (such as in cases where the access barrier 602 is physically detached from the access mechanism 600 and operated manually).

Figure 9G:
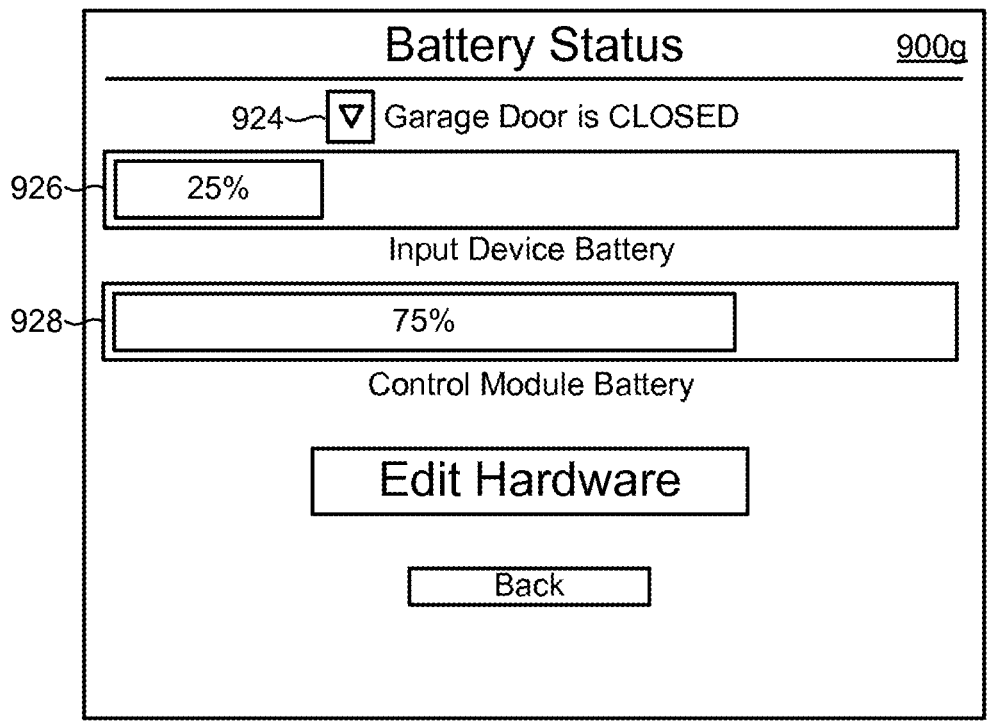

FIG. 9G shows one embodiment of a page 900g displaying various system status or settings. In the illustrated embodiment, the page 900g displays a current status 924 of an access barrier 602 (i.e., whether the access barrier 602 is opened or closed) as well as the status 926, 928 of various hardware devices, specifically the current battery charge level of an input device 606b (or tilt plate device 1600 as shown in FIGS. 16-18) and/or control module 606a. Other status information, such as whether an input device 606b (or tilt plate device 1600 as shown in FIGS. 16-18), control module 606a, or various sensors 608 are up and running correctly, or an Internet or other network connection is operating correctly, may also be displayed.

Figure 9H:
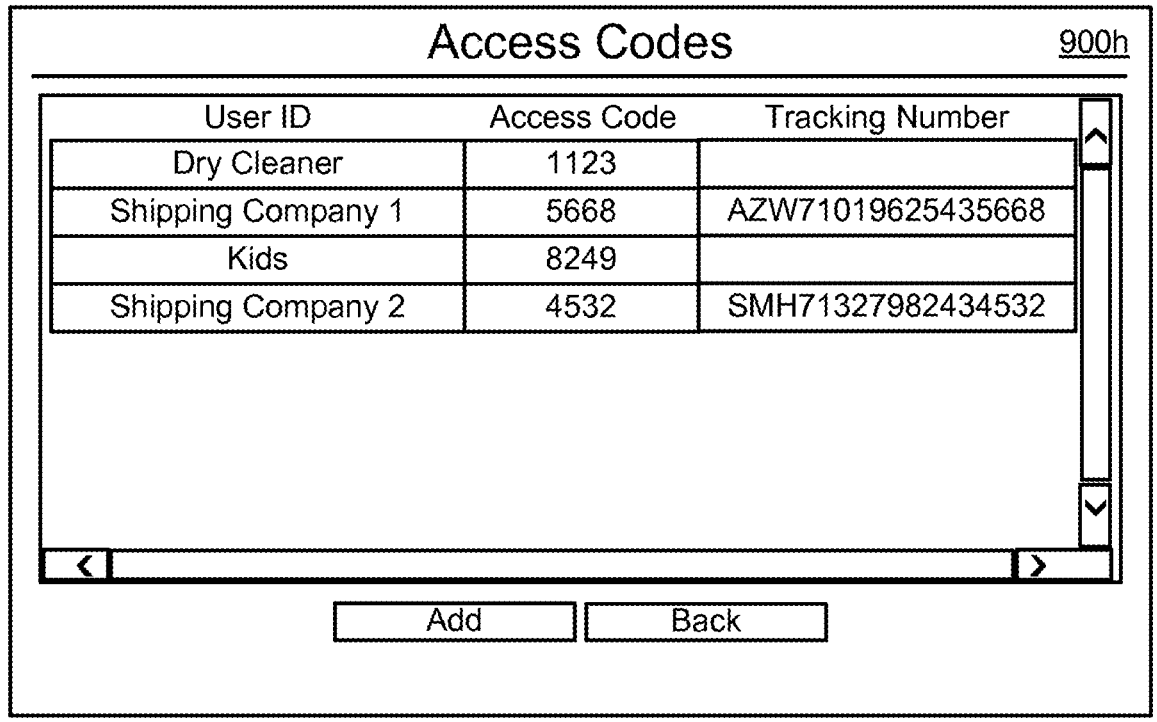

Variations of the pages 900a-g illustrated in FIGS. 9A through 9G are possible and within the scope of the invention. For example, referring to FIG. 9H, where an access-code-management application 838 is used in association with a delivery fulfillment system 100, as illustrated in FIGS. 1 through 5, a page 900h may be provided that links access codes to specific tracking numbers. Among other benefits, this feature may enable a user to track which access codes are associated with tracking numbers as well as determine if and when a particular package or goods has been delivered to an enclosure 110.

Figure 10:
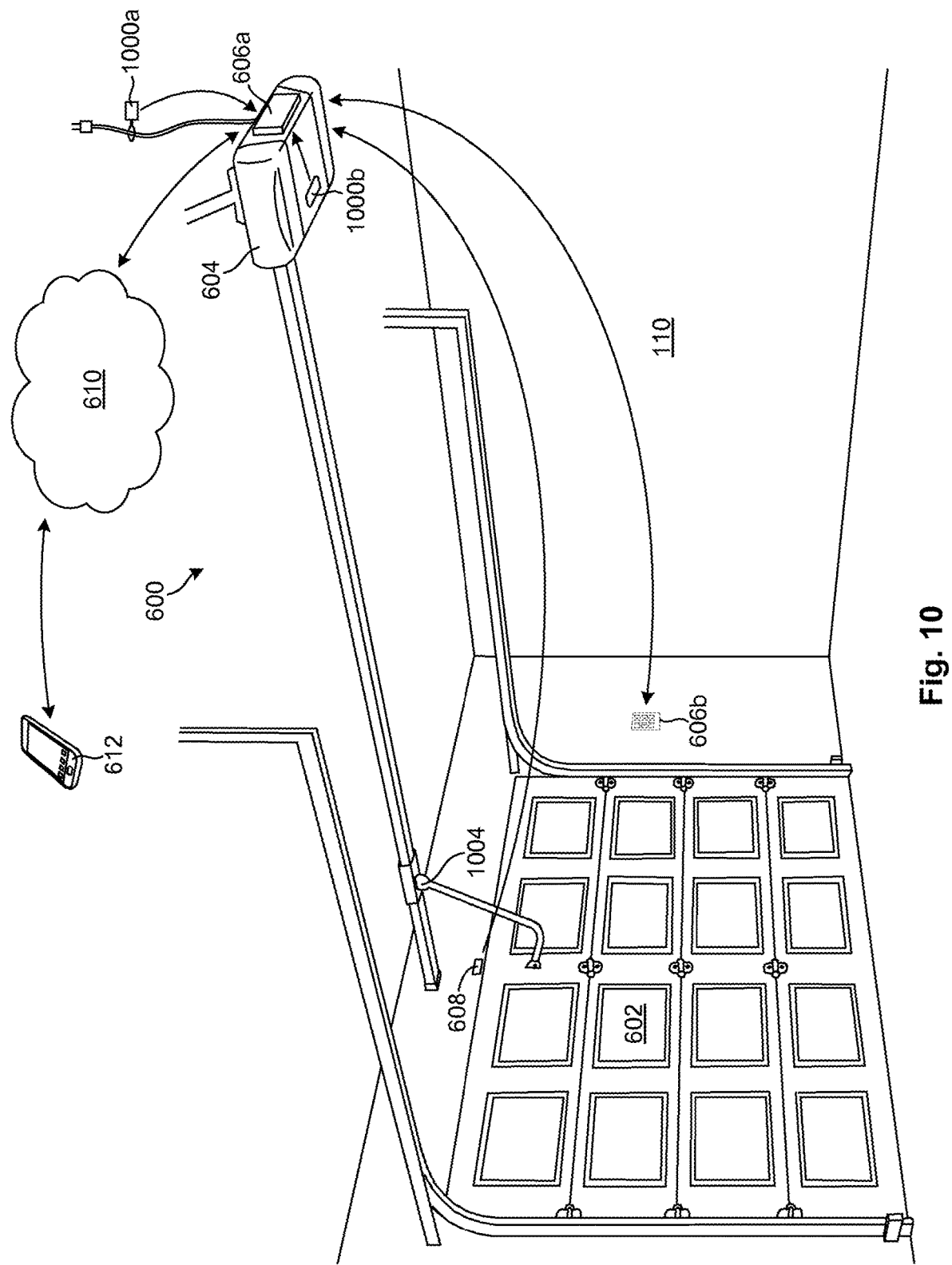
FIG. 10 shows one embodiment of a system for detecting potentially unauthorized access to an enclosure.

Referring to FIG. 10, as previously mentioned, in certain embodiments a user may be notified if an enclosure 110 is opened without actuating the access mechanism 600. Such a scenario may occur, for example, where a garage door 602 is opened without using a garage door opener 604. For example, a garage door opening mechanism 600 may include a latch 1004 or lever 1004 that allows a garage door 602 to temporarily disconnect from the garage door opening mechanism 600, thereby allowing the garage door 602 to be opened or closed manually without assistance from the garage door opening mechanism 600. This feature may enable a user to open or close a garage door 602 in the event of a power outage or failure of the garage door opening mechanism 600. Unfortunately, this feature may also enable unauthorized persons to break into garages 110 or other enclosures 110. For example, it has been well documented that a coat hanger or other wire may be inserted between a garage door 602 and the garage wall from the exterior of the garage 110 to manipulate the latch 1004 or lever 1004. This may disconnect the garage door 602 from the garage door opening mechanism 600 to enable unauthorized access to the garage 110.

In order to detect potentially unauthorized access to an enclosure 110 such as a garage 110, a control module 606a or other device in accordance with the invention may be configured to identify situations where the garage door 602 is opened without assistance from a garage door opening mechanism 600. In such situations, the garage door 602 may move while the motor and other connected parts of the garage door opening mechanism 600 may (1) remain substantially stationary or (2) move while not providing the motive force needed to move the garage door 602. Thus, detecting potential unauthorized access may be accomplished by detecting movement of the garage door 602 with a concurrent lack of movement or energization of the motor.

To accomplish this, one or more sensors 608 may be provided to detect movement of an access barrier 602 of the enclosure 110. For example, various magnetic sensors 608 currently on the market may be used to detect when the access barrier is opened or closed. Infra-red sensors 608, light sensors 608, or other suitable sensors 608 may also be used to detect movement of the access barrier 602.

Similarly, one or more sensors 1000 may be used to detect operation of a garage door opener 604, particularly a motor of the garage door opener 604. For example, a current sensor 1000a internal or external to the control module 606a may be used to detect whether the motor is energized by detecting electrical current drawn by the motor. If no current is drawn when a garage door 602 is opened, it may be concluded that the garage door opener 604 was not used to open the garage door 602. Alternatively, a vibration sensor 1000b may be used to detect vibration of the motor. Little or no vibration may indicate that a garage door opener 604 was not used to open a garage door 602. Other types of sensors may be used to detect operation of the motor in different embodiments. For example, a voltage sensor 1000 may detect a voltage drop of electrical power supplied to the motor, which occurs when the motor is energized. Alternatively, a movement sensor 1000 such as a rotational sensor may be used to detect rotation of the motor or movement of other parts (e.g., drive mechanism, chain, belt, etc.) connected to the motor.

In addition to detecting potentially unauthorized access, the sensors 608, 1000 may be used to detect other conditions which may warrant attention. For example, the sensors 608, 1000 may be used to detect scenarios where an access mechanism 600 was actuated but an access barrier 602 such as a garage door 602 did not open or close as intended, as may occur with a broken drive mechanism. This may allow the system to perform the operation again, perform diagnostics to determine the cause of the problem, and/or alert a user of the problen Other sensors may also be incorporated into the control module 606a. For example, a camera (still or video) or motion sensor may be incorporated into or connected to the control module 606a to monitor activity that occurs whenever an access barrier 602 is opened and/or closed. For example, a camera feed could be recorded or monitored remotely anytime a garage door 602 is opened or closed to ensure that access codes are being used for authorized activities.

Figure 11:
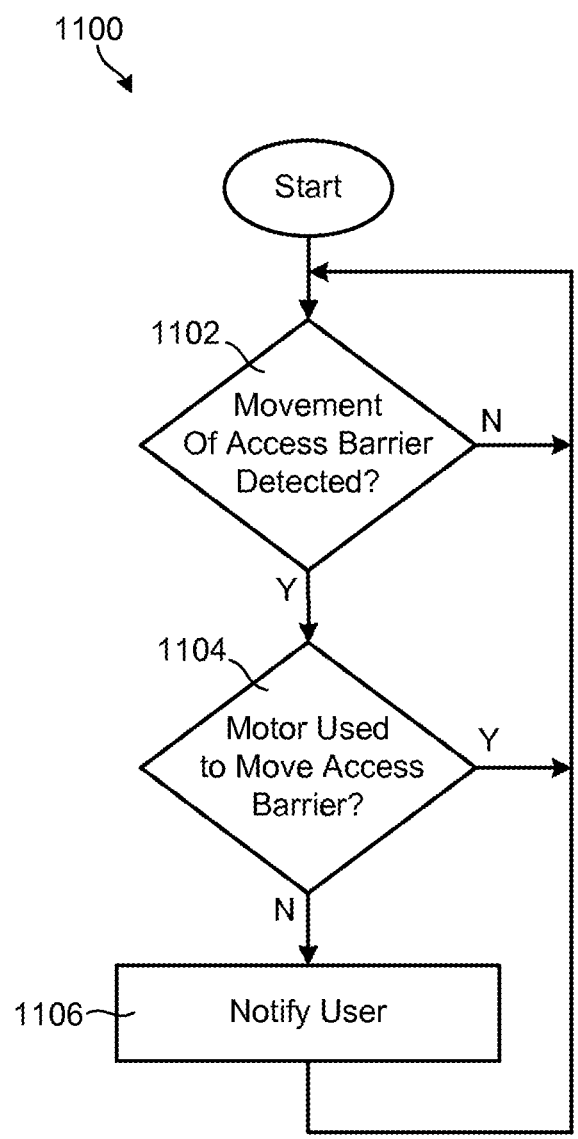
FIG. 11 shows one embodiment of a method for detecting potentially unauthorized access to an enclosure.

Referring to FIG. 11, one embodiment of a method 1100 for detecting potentially unauthorized access to an enclosure 110 is illustrated. Such a method 1100 may, in certain embodiments, be implemented in the control module 606a previously discussed. As shown, the method 1100 may initially determine 1102 whether an access barrier 602 (e.g., a garage door 602) has moved or is moving. This may be accomplished using the one or more sensors 608 previously discussed. If the access barrier 602 has moved or is moving, the method 1100 may determine 1104 whether a motor of an access mechanism 600 (e.g., a garage door opening mechanism 600) was used to move the access barrier 602. If the motor was not used to move the access barrier 602, the method 1100 may notify 1106 a user, such as by sending an email or text message to the user. Notifying 1106 the user may include notifying the user of potential unauthorized access to the enclosure 110.

Figure 12:
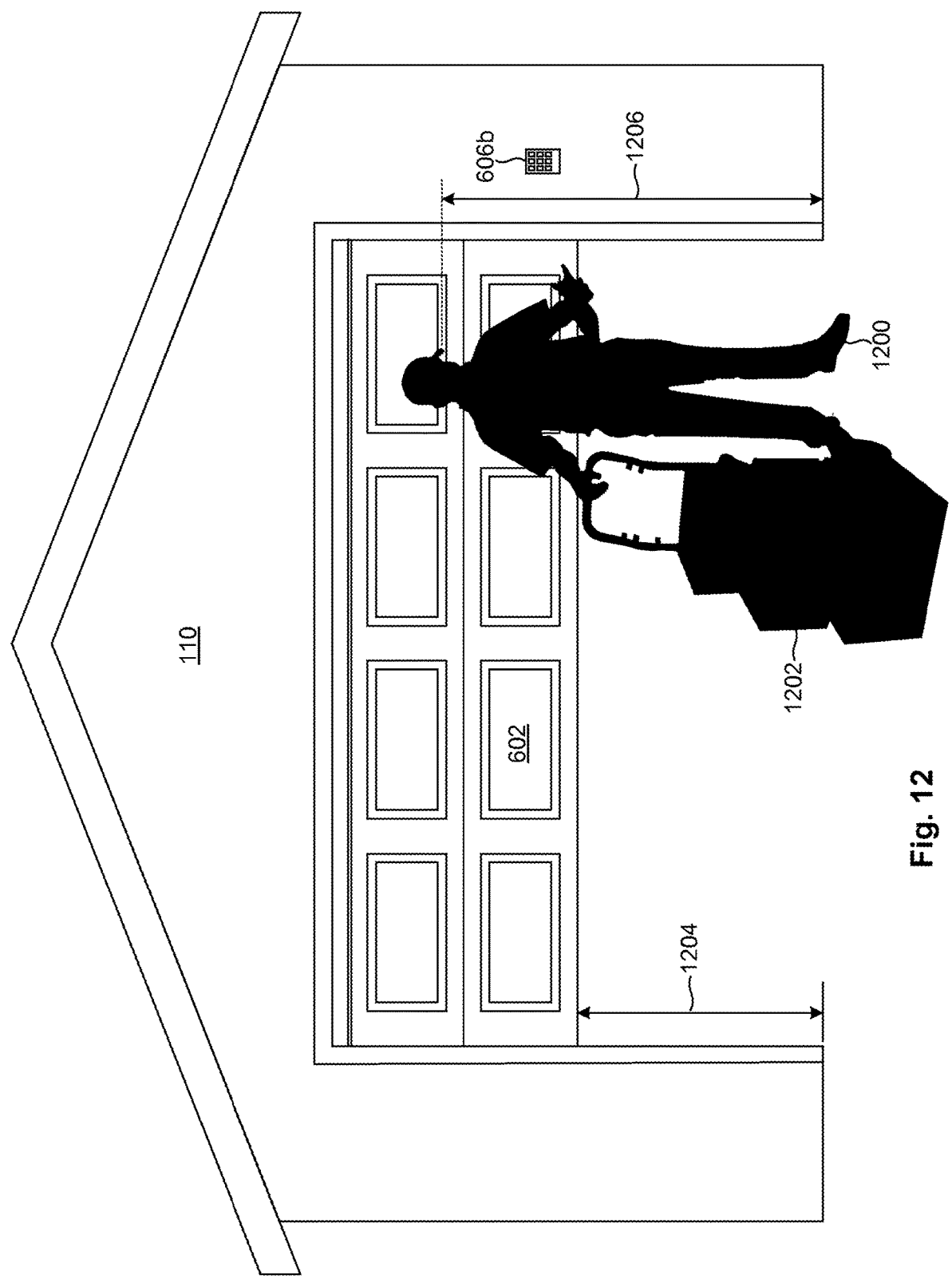
FIG. 12 shows a garage door configured to stop at a level substantially below an eye level of a delivery agent, while providing sufficient clearance to deliver packages into the garage.

Referring to FIG. 12, in certain cases, it may be desirable to enable a delivery agent 1200 or other individual 1200 to access an enclosure 110 while still providing a certain amount of privacy within the enclosure 110. For example, it may be desirable to enable a delivery agent 1200 or other individual 1200 to deliver a package 1202 or goods 1202 into the enclosure 110 while preventing the delivery agent 1200 or other individual 1200 from viewing much or all of the contents of the enclosure 110. This may be achieved, in certain cases, by partially opening an access barrier 602 such as a garage door 602. Stopping a garage door 602 at an intermediate position (between a fully closed and fully open position) may provide access to the enclosure 110 beneath the garage door 602 while substantially obstructing a delivery agent's or individual's view into the enclosure 110. In certain embodiments, the intermediate position may be selected based a size and/or dimensions of goods that are to be delivered into an enclosure 110 and/or a level that would substantially restrict visibility into the enclosure 110. FIG. 12 shows a garage door 602 configured to stop at a level 1204 substantially below an eye level 1206 of a delivery agent 1200, while providing sufficient clearance to deliver packages 1202 into the enclosure 110.

In certain embodiments in accordance with the invention, a setting may be established for an access code to cause the access barrier 602 to stop at an intermediate position. When the access code with the setting is used to access the enclosure 110, the access barrier 602 will stop at the intermediate position instead of fully opening. The setting may take on various different forms. For example, in certain embodiments, the setting may be represented by an amount of time (e.g., seconds, etc.) needed by an access mechanism to move the access barrier from a fully closed position to an intermediate position. For example, if an access mechanism 600 requires three seconds to move an access barrier 602 from a fully closed position to an intermediate position and a user wishes to establish an access code to stop at the intermediate position, a user may assign a value of three to the setting associated with the access code. When the access code is used to access the enclosure 110, the access mechanism 600 will raise the access barrier 602 for three seconds, thereby allowing the access barrier 602 to stop at or near the intermediate position.

FIG. 14A shows one embodiment of a page 1400*a* for adding an access code that partially opens an access barrier 602 to a desired intermediate position. As shown, the page 1400*a* includes a field 1402 that enables user to specify an amount of time to move the access barrier 602 when the access code is used to open the access barrier 602. FIG. 15A shows one embodiment of a page 1500*a* that lists access codes and amounts of time, if any, that are associated with the access codes. In this example, a value of "no limits" indicates that the associated access code fully opens the access barrier 602. The pages 1400*a*, 1500*a* may, in certain embodiments, form part of a GUI of an access-code-management application 838, as previously discussed herein.

In another embodiment, the setting associated with an access code may be represented by a value between a first value associated with a fully closed position and a second value associated with a fully open position. For example, if a fully closed position is represented by a value of zero and a fully open position is represented by a value of one, a value between zero and one may be used to indicate a desired intermediate position. For example, a value of ¼ or 0.25 or 25% may indicate that an access barrier 602 is to be opened a quarter of the way when the associated access code is used to access the enclosure 110. Similarly, a value of ½ or 0.5 or 50% may indicate that the access barrier 602 is to be opened half of the way when the associated access code is used to access the enclosure 110. Alternatively, or additionally, a value reflecting a distance in inches, feet, or the like, may be assigned to the setting to indicate a desired height of the access barrier 602. For example, a user may assign a value of twenty-four inches to the setting to indicate that the user wants the access barrier 602 to open to a height of twenty-four inches from the ground. Other methods for specifying how much to open (or close) an access barrier 602 are possible and within the scope of the invention.

FIG. 14B shows one embodiment of a page 1400*b* for adding an access code with a setting having a value between a first value associated with a fully closed position and a second value associated with a fully open position. As shown, the page 1400*b* includes a field 1402 to enable a user to specify an amount to open an access barrier 602 when the access code is utilized. FIG. 15B shows one embodiment of a page 1500*b* displaying a list of access codes as well as amounts an access barrier 602 will be opened when using the access codes. In this example, a value of "¼" indicates that the associated access code will open the access barrier 602 a quarter of the way, a value of "½" indicates that the associated access code will open the access barrier 602 half of the way, and a value of "1" indicates that the associated access code will open the access barrier 602 all of the way. The pages 1400*b*, 1500*b* may, in certain embodiments, form part of a GUI of an access-code-management application 838, as previously discussed herein.

Calibration may be required to implement the technique discussed in association with FIGS. 14B and 15B. Such calibration may include measuring a total amount of time required for the access mechanism 600 to move the access barrier 602 from a fully closed position to a fully open position. Once this calibration is performed, moving the access barrier 602 to an intermediate position may be as simple as operating the access mechanism 600 for a fraction of the total amount of time. For example, if the setting is ½ or 0.5, the access mechanism 600 may be operated for half of the total amount of time to raise the access barrier 602 approximately halfway. In other embodiments, a total number of rotations of a motor, transmission, or other rotating member of the access mechanism 600 may be counted to move an access barrier 602 between a fully closed and fully open position. Moving the access barrier 602 to a desired intermediate position may be achieved by rotating the motor or transmission some fraction of the total number of rotations. For example, if the setting is ¼ or 0.25, the motor or transmission may be rotated a quarter of the total number of rotations to achieve an access barrier 602 that is approximately a quarter of the way open.

Other techniques for achieving a desired intermediate position may also be used. For example, some access mechanisms 600 may include or be equipped with encoders or other sensors to enable a current position of an access barrier 602 to be determined. In such embodiments, the access barrier 602 may be moved until the current position equals a desired intermediate position and then stopped at the intermediate position. Other methods or techniques for moving an access barrier 602 to a desired intermediate position may be used and are within the scope of the invention.

As mentioned above, in certain embodiments, a setting associated with an intermediate position may be associated with an access code. In certain embodiments, a user may manually assign a value to the setting, such as when a new access code is created and programmed into a control mechanism 606. In certain embodiments, the user may manually observe how long it takes for an access barrier 602 to reach a desired intermediate position and assign a value to the setting accordingly. In other embodiments, a value may be automatically assigned to the setting. For example, in scenarios where an access code is automatically generated in association with a shipment or delivery of goods, as discussed in association with FIGS. 1 through 5, the access code may be automatically configured to open the access barrier 602 to an intermediate position.

In such embodiments, the intermediate position may be the same for all access codes associated with a particular shipper or shippers. In certain embodiments, a default setting may be designated by a customer, for example, that establishes an intermediate position for all access codes that are generated in association with a delivery of goods. In other embodiments, a setting associated with an intermediate position may vary for different shipments or deliveries. For example, in order to slide larger packages beneath an access barrier 602, a higher intermediate position may be needed. Similarly, a lower intermediate position may be needed for smaller packages. In certain cases, an intermediate position may be low enough that smaller packages may be inserted beneath the access barrier 602 while preventing individuals such as delivery agents from entering the enclosure 110. For example, four inches of clearance beneath an access barrier 602 may be sufficient to deliver small packages containing valuable items such as jewelry, electronics, or the like, into an enclosure 110, while preventing individuals from entering the enclosure 110.

Figure 13:
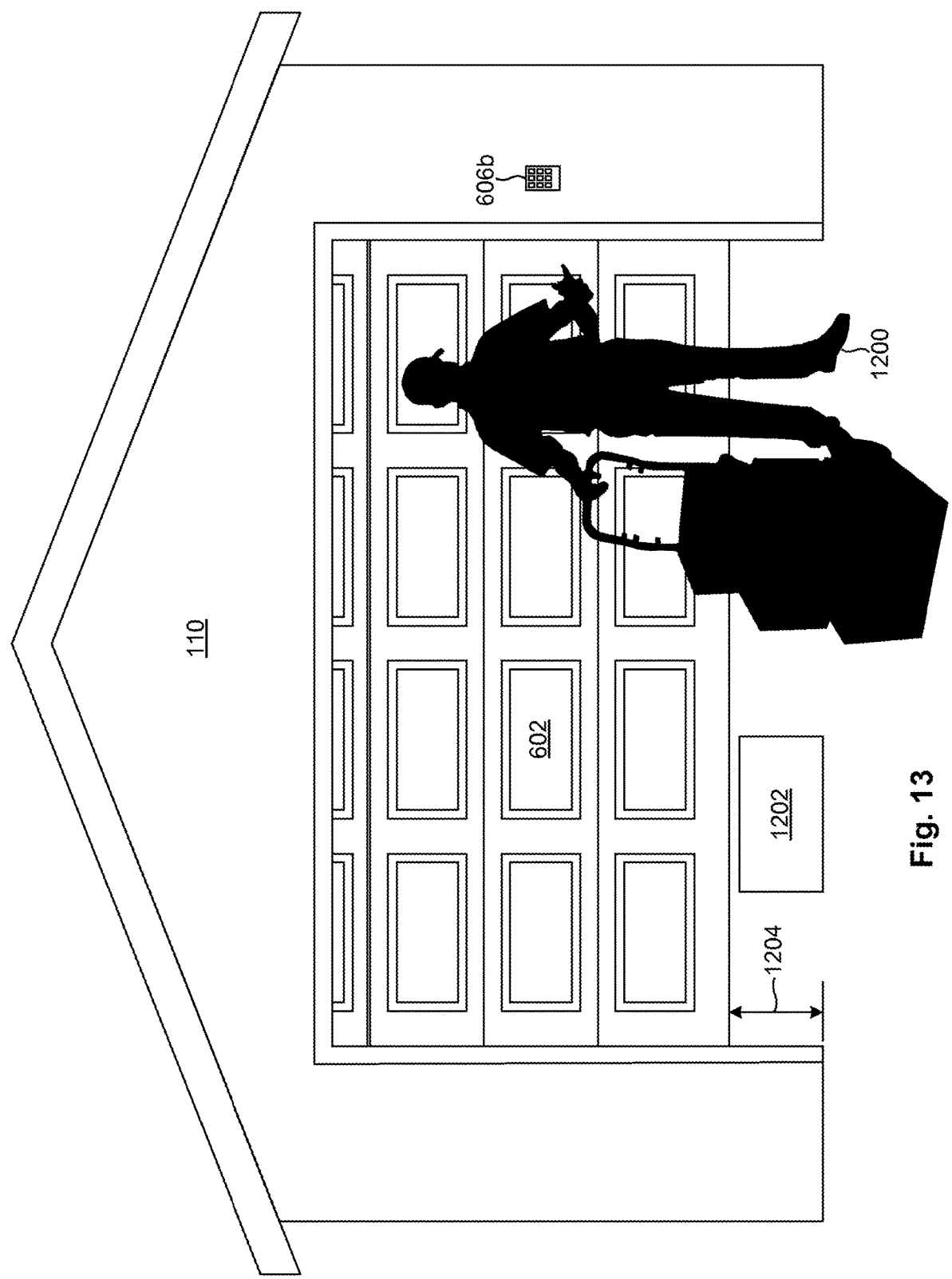
FIG. 13 shows a garage door configured to stop at a level just sufficient to provide clearance for a package.

In certain embodiments, when requesting an access code in association with a delivery of goods, a retailer, shipper, or other purveyor of goods may provide information related to the size and/or dimensions of a delivery. A setting associated with an intermediate position of the access barrier 602 may be automatically adjusted based on the delivery's size and/or dimensions. In certain embodiments, a server 108 that generates or otherwise provides the access code may be configured to automatically adjust the setting to accommodate the delivery's size or dimensions. Thus, in certain embodiments, the setting may be manually or automatically adjusted based on a delivery's size or dimensions. FIG. 13 shows a garage door 602 configured to stop at a level 1204 just sufficient to provide clearance for a package 1202.

Although particular reference has been made herein to enclosures 110 such as garages 110, the systems and methods disclosed herein may be equally applicable to other types of enclosures 110, such as reception boxes, living quarters, gated areas, warehouses, sheds, and the like. Such enclosures 110 may be substantially enclosed or enclosed around a perimeter thereof, as in a gated area. Thus, the term "enclosure" should be broadly interpreted to include all types of enclosures, whether fully enclosed or not. Similarly, the term "access mechanism," although described with particular reference herein to garage door opening mechanisms 600, may include a wide variety of different access mechanisms 600, including door locks, automatic door openers, gate locks, automatic gate openers, and the like. Nothing in this disclosure should be interpreted to indicate that the disclosed systems and methods are only applicable to garage door opening mechanisms 600.

Similarly, the phrase "tracking number" has been used primarily herein to describe unique identifiers issued by freight or shipping companies for packages or other deliveries of goods. However, in other embodiments a "tracking number" may include unique identifiers such as sales order numbers, product identifiers, or other unique identifiers that are used to identify or track orders of goods, shipments of goods, or particular products or items. Thus, the phrase "tracking number" is intended to be used broadly in the foregoing description and claims to encompass any type of unique identifier associated with a product or an order or shipment of goods.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 16A:
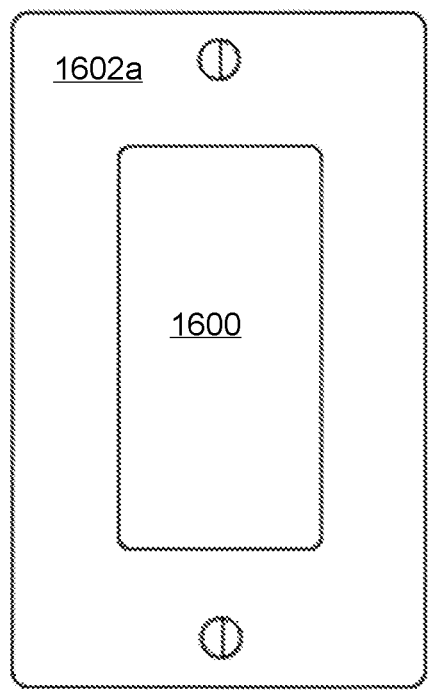
FIGS. 16A and 16B show embodiments of a tilt plate device.
Figure 16B:
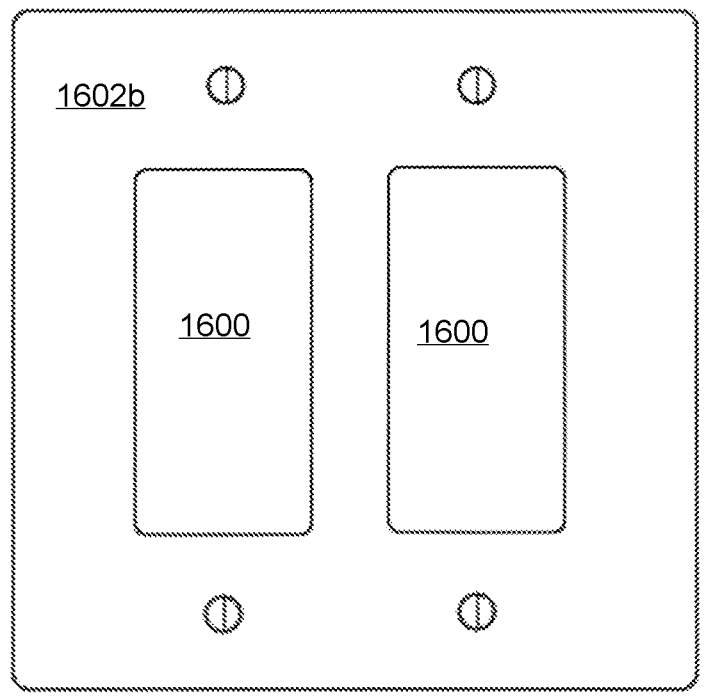
Figure 17:
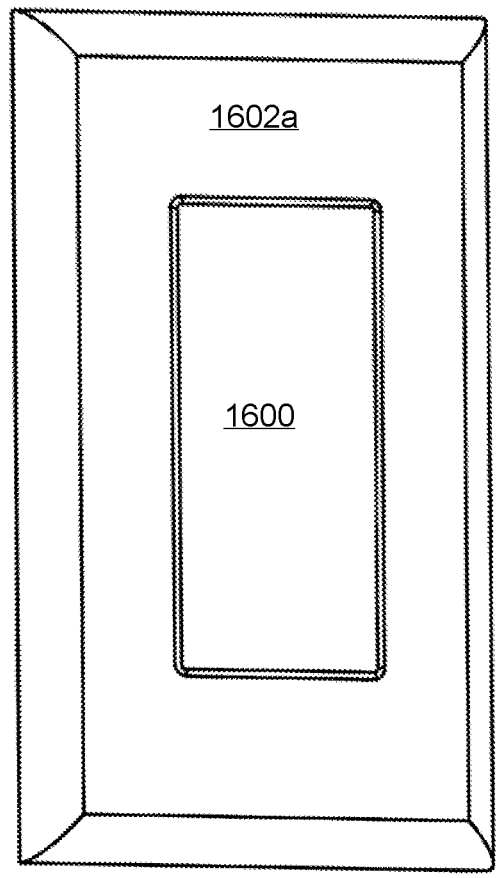
FIG. 17 shows an embodiment of a tilt plate of the present invention.

FIG. 16A shows one embodiment of tilt plate device 1600 mounted in a standard rocker light switch cover 1602a. The center switch portion is the tilt plate device 1600 with electronics and switch features mounted on the backside of the tilt plate. The dimensions are designed such that it allows for integration of a standard rocker-type switch cover 1602a that is attached directly to a surface such as a wall with no alteration or holes other than the face plate mounting holes. The tilt plate may be attached to a wall or surface by covering the tilt plate with the wall plate 1602a and attaching the wall plate to the wall or surface. In certain cases, the tilt plate 1600 may be added to a current wall-mounted electrical switch location by adding the tilt plate 1600 device to one side and changing to a dual gang or larger panel cover 1602b and mounting the tilt plate device 1600 or devices in the additional opening(s), as shown in FIG. 16B.

Figure 18A:
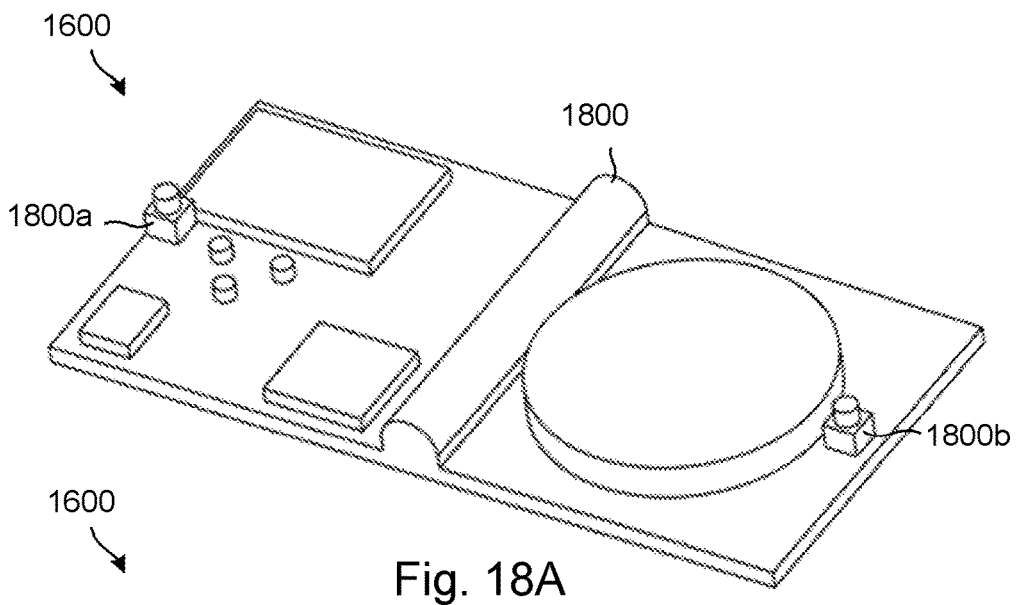
FIGS. 18A-18C show views of the back side of the tilt plate of the present invention.
Figure 18B:
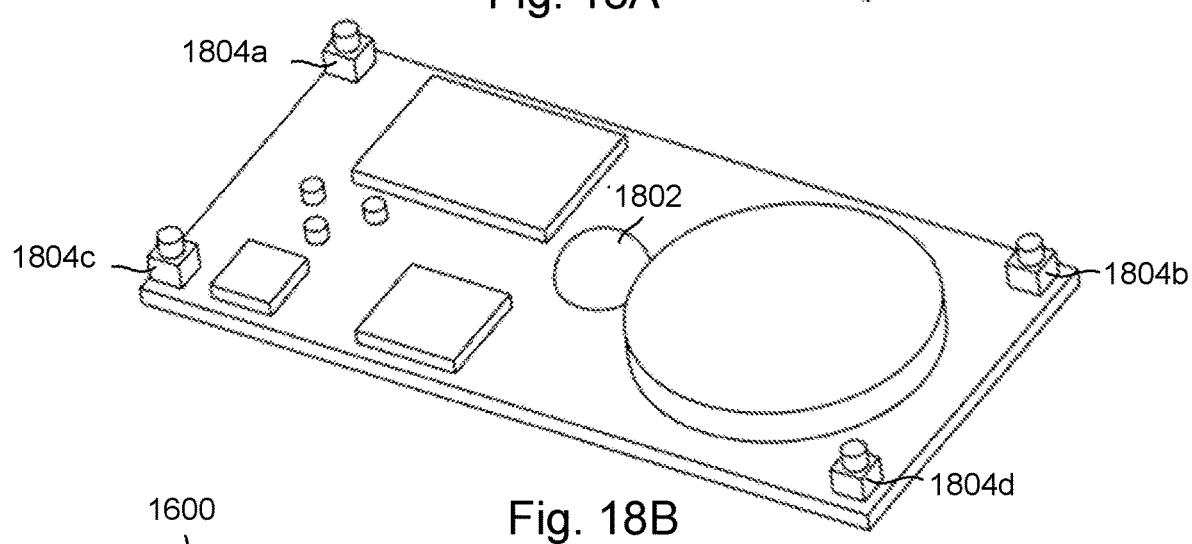
Figure 18C:
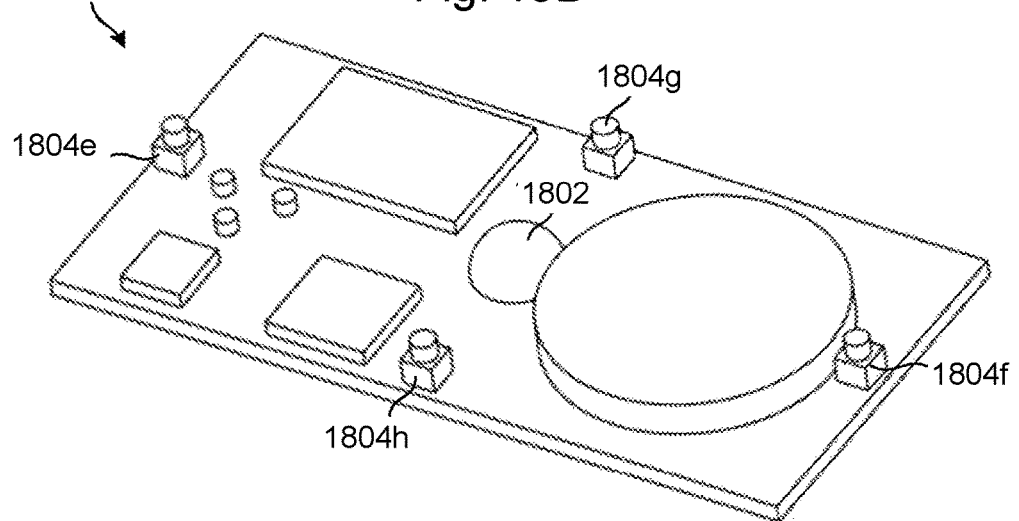

FIGS. 17 and 18A-C show a tilt plate device 1600 configured to fit in a standard, rocker light switch cover 1602a. As shown in FIG. 17, the tilt plate device 1600 fits into that opening and the wall plate 1602a is affixed to the wall with standard screw or other mounting systems. FIGS. 18A-C show various embodiments of the back of a tilt plate device 1600, which is held against a wall by the wall plate 1602a. FIG. 18A shows one embodiment of a tilt plate device 1600 that pivots along a center ridge 1800 held against a wall. FIGS. 14B and 14C show embodiments of a tilt plate device 1600 that pivot around a partial spherical feature 1802 held against a wall.

2 In the embodiment of FIG. 18A, pressing either end of the tilt plate device will actuate a switch 1800a, 1800b on the respective end. The switch 1800a, 1800b may be spring loaded with an elastic material to cause it to return a neutral position after being pressed. This type of input operation will work with one, two, three, four or more switches 1800a arranged in appropriate locations around a fulcrum 1800 type of feature. FIG. 18B shows a configuration having switches 1804a-d in the corners and a partial sphere feature 1802 that allows the device to pivot around its center. Pressing a corner will actuate the switches 1804a-d under the corner. Pressing an edge will actuate two corner switches 1804a-d simultaneously, enabling additional types of inputs or selections. FIG. 18C shows a configuration having switches 1804e-h located on the edges of the device 1800. Pressing an edge will actuate the switches 1804e-h under the edge. Pressing a corner will actuate two edge switches 1804e-h simultaneously, enabling additional types of inputs or selections.

The tilt plate devices 1600 shown in FIGS. 18A through 18C may be used as either asset tilt plates or tilt plates, either in stationary or mobile applications. The ability to use a tilt plate 1600 as an input device allows the tilt plate to be used in a wide variety of different applications. For example, the inputs on the tilt plate may be used to control a wide variety of different devices. In one contemplated embodiment, the tilt plate device enables a large number of different devices (e.g., doors, window blinds or groups of window blinds, lights, fans, heating systems, cooling systems, etc.) to be controlled without requiring separate controls for each device or system. For example, using the directional switches 1804*e-h* illustrated in FIG. 18C, actuating the switches 1804*g-h* on the sides of the tilt plate device 1600 may be used to select a device or system to control, whereas actuating the top and bottom switches 1804*e-f* may be used to adjust an amount associated with the device or system. Specifically, actuating the switches 1804*g-h* on the sides of the tilt plate device 1600 enables a user to select a current function for the tilt plate device 1600. A set of indicators (e.g., colored LEDs, LEDs with accompanying pictures or icons, etc.) may optionally be provided to indicate the current function of the tilt plate device 1600. Actuating the switches 1804*e-h* on the top/bottom of the tilt plate device 1600 enables the user to increase or decrease an amount associated with the current function.

In other applications, the tilt plate device 1600 may be used to input information associated with an asset. For example, if the tilt plate is attached to or travelling with an asset, a user may input information to indicate a status of the asset. For example, a button press or combination of button presses may be used to indicate that certain tasks (e.g., maintenance tasks, manufacturing tasks, service tasks, etc.) have been completed or are being performed on an asset. This allows the asset's status, in addition to its location, to be tracked from a remote or centralized location. Such an embodiment would allow, for example, the status of a work order to be tracked as it passes from station to station within a factory. Other applications are also possible and within the scope of the invention.

Figure 19A:
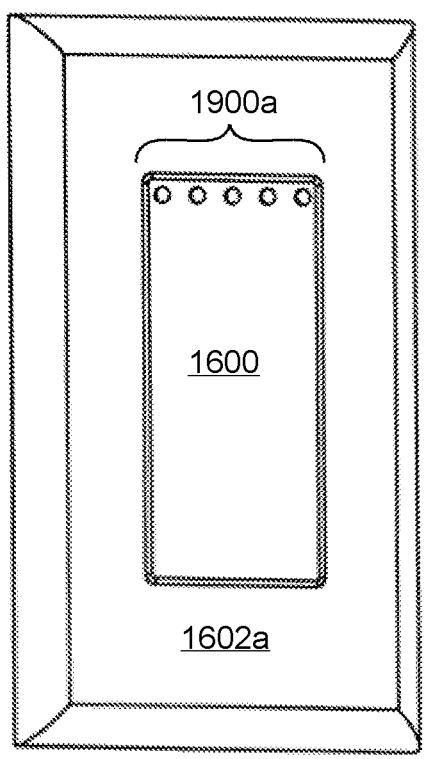
FIGS. 19A and 19B show additional embodiments of the present invention.
Figure 19B:
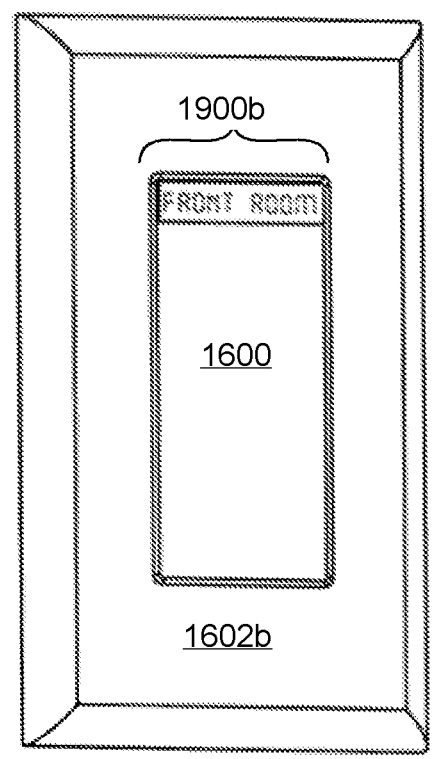

FIGS. 19A and 19B show tilt plates 1600 configured to provide visual feedback via an LED 1900*a* or set of LEDs 1900*a*, or a display 1900*b* such as a single, multi-line, or graphical LCD 1900*b*. The LEDs 1900*a* may be single or multi-color and may be used to indicate item selected, indicate a level such as temperature level for an air conditioner control, or light level for a dimmer function. This may be displayed as turning on/off discrete LEDs as the level changes or changing the color of the LEDs such as from red to blue as cooler temperature is selected through activation of the switching functions by pressing the corners or quadrants of the device. The remainder of the face of the device 1600 may be a solar cell used to charge and maintain the operating power requirements of the device. Lights 1900*a* or displays 1900*b* may be arranged as desired for functions around edges of the device to provide data/feedback on selection and status of selected functions.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A method for delivering a package, the method comprising:
providing an enclosure comprising a door;
the door comprising an access code input device comprising a tilt plate comprising a front side touch surface, a raised pivot on the backside of the tilt plate, and a plurality of spring loaded switches mounted along the periphery of the back side of the tilt plate and electronic equipment mounted on the back side thereof such that an access code is entered by pressing along the periphery of the front side of the touch plate;
providing a mechanism for opening and closing the door and a controller, the controller being in communication with the access code input device proximate the door comprising an access code reader for controlling the mechanism;
providing a package comprising a delivery label attached to the package comprising an access code comprising dimensions for the package to be delivered;
the access code further comprising instructions to partially move the door only for an amount of time needed to partially open the door from a closed position or partially close the door from an open position according to the dimensions of the package to only allow passage of the package;
presenting the package delivery label to the access code reader, or entering the access code using the input access code device, and
partially opening or closing the door only to allow passage of the package, delivering the package through the door opening, and closing the door.

2. The method of claim 1, wherein the access code comprises an amount of time needed by the mechanism to move the door from a fully closed position to a partially open position only wide enough to allow passage of the package.

3. The method of claim 1, wherein the access code comprises a no-value setting overriding the dimensions for opening or closing the door only to allow delivery of the package.

4. The method of claim 1, wherein the dimensions are at least one of a fraction, a decimal, and a percentage.

5. The method of claim 1, wherein the dimensions are adjusted based on at least one of standard size and standard dimensions of the package to be delivered into the enclosure.

6. The method of claim 1, wherein the dimensions are only sufficient to enable a package to be delivered into the enclosure, while preventing an individual from entering the enclosure.

7. The method of claim 1, wherein the dimensions of the package are derived from a word or phrase embedded in the access code.

8. The method of claim 1, wherein the package dimensions are automatically set by a shipper of the package to be delivered.

9. The method of claim 1, the package dimensions are manually determined by the recipient of the package to be delivered.

10. A system for delivering a package, the system comprising:
at least one processor;
at least one memory device coupled to the at least one processor and storing computer-usable program code for execution on the at least one processor,
the computer-usable program code comprising: computer-usable program code to obtain an access code configured to enable access to an enclosure;
an enclosure comprising a door;
the door comprising an access code input device comprising a tilt plate comprising a front side touch surface, a raised pivot on the backside of the tilt plate, and a plurality of spring loaded switches mounted along the periphery of the back side of the tilt plate and electronic equipment mounted on the back side thereof such that an access code is entered by pressing along the periphery of the front side of the touch plate;

a mechanism for opening and closing the door and a controller, the controller being in communication with the access code input device proximate the door comprising an access code reader for controlling the mechanism;

a package comprising a delivery label attached to the package comprising an access code comprising dimensions for the package to be delivered;

the access code further comprising instructions to partially move the door only for an amount of time needed to partially open the door from a closed position or partially close the door from an open position according to the dimensions of the package to only allow passage of the package;

presenting the package delivery label to the access code reader or entering the access code using the input access code device, and partially opening or closing the door only to allow passage of the package, delivering the package through the door opening, and closing the door.

11. The system of claim 10, wherein the access code comprises an amount of time needed by the mechanism to move the door from the fully closed position to a partially open position only wide enough to allow passage of the package.

12. The system of claim 10, wherein the access code comprises a no-value setting overriding the dimensions for only opening or closing the door only to allow delivery of the package.

13. The system of claim 10, wherein the dimensions are at least one of a fraction, a decimal, and a percentage.

14. The system of claim 10, wherein the dimensions are adjusted based on at least one of standard size and standard dimensions of a package to be delivered into the enclosure.

15. The system of claim 10, wherein the dimensions are only sufficient to enable a package to be delivered into the enclosure, while preventing an individual from entering the enclosure.

16. The system of claim 10, wherein the dimensions of the package are derived from a word or phrase embedded in the access code.

17. The system of claim 10, wherein the package dimensions are automatically set by a shipper of the package to be delivered.

18. The system of claim 10, wherein the package dimensions are manually determined by the recipient of the package to be delivered.

19. A computer program product for enabling access to an enclosure, comprising:

a computer program product comprising a non-transitory computer-readable storage medium having computer-usable program code embodied therein, the computer-usable program code comprising an access code for allowing access to the enclosure;

the enclosure comprising a door;

the door comprising an access code input device comprising a tilt plate comprising a front side touch surface, a raised pivot on the backside of the tilt plate, and a plurality of spring loaded switches mounted along the periphery of the back side of the tilt plate and electronic equipment mounted on the back side thereof such that an access code is entered by pressing along the periphery of the front side of the touch plate;

the enclosure further comprising a mechanism for opening and closing the door and a controller proximate the door, the controller being in communication with the access code input device proximate the door comprising an access code reader for controlling the mechanism;

a package comprising a delivery label attached to the package comprising an access code comprising dimensions for the package to be delivered;

the access code further comprising instructions to partially move the door only for an amount of time needed to partially open the door from a fully closed position or partially close the door from a fully open position according to the dimensions of the package to only allow passage of the package;

presenting the package delivery label to the access code reader or entering the access code using the input access code device, and partially opening the door only to allow passage of the package, delivering the package through the door opening, and closing the door.

20. The computer program product of claim 19, wherein the access code comprises an amount of time needed by the mechanism to move the door from the fully closed position to partially open the door only wide enough to allow passage of the package according to the dimensions of the package.

* * * * *